US010591156B2

(12) United States Patent
Kiyama et al.

(10) Patent No.: US 10,591,156 B2
(45) Date of Patent: Mar. 17, 2020

(54) BURNER, COMBUSTION DEVICE, BOILER, AND BURNER CONTROL METHOD

(71) Applicant: Mitsubishi Hitachi Power Systems, Ltd., Yokohama-shi, Kanagawa (JP)

(72) Inventors: Kenji Kiyama, Yokohama (JP); Toshimitsu Ichinose, Yokohama (JP); Miki Shimogori, Yokohama (JP); Toshihiko Mine, Yokohama (JP); Kenji Yamamoto, Yokohama (JP); Ryuichiro Tanaka, Yokohama (JP); Akira Baba, Yokohama (JP); Koji Kuramashi, Yokohama (JP); Koutaro Fujimura, Tokyo (JP); Keigo Matsumoto, Tokyo (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 84 days.

(21) Appl. No.: 15/569,147

(22) PCT Filed: May 30, 2016

(86) PCT No.: PCT/JP2016/065929
§ 371 (c)(1),
(2) Date: Oct. 25, 2017

(87) PCT Pub. No.: WO2016/199613
PCT Pub. Date: Dec. 15, 2016

(65) Prior Publication Data
US 2018/0142887 A1    May 24, 2018

(30) Foreign Application Priority Data

Jun. 12, 2015 (JP) .................. 2015-119311

(51) Int. Cl.
*F23C 7/00* (2006.01)
*F23D 1/00* (2006.01)
(Continued)

(52) U.S. Cl.
CPC .............. *F23D 1/005* (2013.01); *F23C 7/008* (2013.01); *F23D 1/00* (2013.01); *F23L 7/007* (2013.01);
(Continued)

(58) Field of Classification Search
CPC ....................................... F23C 7/008
(Continued)

(56) References Cited

U.S. PATENT DOCUMENTS 4,297,093 A * 10/1981 Morimoto ............... F23C 7/004
431/10
4,626,195 A * 12/1986 Sato ......................... F23D 14/24
431/12

(Continued)

FOREIGN PATENT DOCUMENTS

CN    1386180 A    12/2002
CN    1749646 A    3/2006

(Continued)

OTHER PUBLICATIONS

International Search Report dated Aug. 16, 2016, issued in counterpart International Application No. PCT/JP2016/065929 (11 pages).

(Continued)

*Primary Examiner* — Avinash A Savani
(74) *Attorney, Agent, or Firm* — Westerman, Hattori, Daniels & Adrian, LLP

(57) ABSTRACT

A burner includes: an inner gas nozzle which extends along an axis while surrounding the axis, and which is capable of supplying a furnace with an inner combustion oxygen containing gas; a fuel supply nozzle surrounding the inner gas (Continued)

nozzle as seen in a direction along the axis, the fuel supply nozzle being capable of supplying the furnace with a fluid mixture of a solid powder fuel and a carrier gas; an outer gas nozzle surrounding the fuel supply nozzle as seen in the direction along the axis, the outer gas nozzle being capable of supplying the furnace with an outer combustion oxygen containing gas; and a flow-velocity-ratio adjustment apparatus capable of adjusting a relative flow velocity ratio of a discharge flow velocity of the inner combustion oxygen containing gas to a discharge flow velocity of the outer combustion oxygen containing gas.

14 Claims, 17 Drawing Sheets

(51) Int. Cl.
*F23L 7/00* (2006.01)
*F23N 1/02* (2006.01)

(52) U.S. Cl.
CPC .......... *F23N 1/022* (2013.01); *F23D 2201/10* (2013.01); *F23D 2201/20* (2013.01); *F23D 2208/00* (2013.01); *F23D 2209/20* (2013.01); *F23D 2900/00016* (2013.01); *F23D 2900/14481* (2013.01)

(58) Field of Classification Search
USPC ........................................... 431/12, 10
See application file for complete search history.

(56) References Cited

U.S. PATENT DOCUMENTS

| | | | |
|---|---|---|---|
| 5,746,804 A * | 5/1998 | Joo | C21B 5/003 75/387 |
| 5,850,776 A | 12/1998 | Takeuchi et al. | |
| 6,237,510 B1 | 5/2001 | Tsumura et al. | |
| 2002/0144636 A1 | 10/2002 | Tsumura et al. | |
| 2003/0110774 A1 | 6/2003 | Saitoh | |
| 2005/0211142 A1 | 9/2005 | Yamamoto et al. | |
| 2006/0191451 A1 | 8/2006 | Jia et al. | |
| 2007/0251467 A1 * | 11/2007 | Xie | F23D 14/085 122/14.31 |
| 2009/0214989 A1 * | 8/2009 | Swanson | F23C 6/047 431/8 |
| 2009/0280442 A1 * | 11/2009 | Varagani | F23C 9/003 431/2 |
| 2010/0223926 A1 | 9/2010 | Orita et al. | |
| 2011/0139048 A1 | 6/2011 | Tamura et al. | |
| 2013/0092257 A1 | 4/2013 | Yasuda et al. | |
| 2013/0291770 A1 | 11/2013 | Kashima et al. | |
| 2013/0305971 A1 * | 11/2013 | Hamel | F23C 7/006 110/264 |

FOREIGN PATENT DOCUMENTS

| | | |
|---|---|---|
| CN | 101988698 A | 3/2011 |
| JP | 58-8908 A | 1/1983 |
| JP | 59-210205 A | 11/1984 |
| JP | 60-71810 U | 5/1985 |
| JP | H09-196310 A | 7/1997 |
| JP | H09-250709 A | 9/1997 |
| JP | H09-280212 A | 10/1997 |
| JP | 11-148610 A | 6/1999 |
| JP | 2002-48306 A | 2/2002 |
| JP | 2002-115810 A | 4/2002 |
| JP | 2002-228109 A | 8/2002 |
| JP | 2002364849 A | 12/2002 |
| JP | 2009-264654 A | 11/2009 |
| JP | 2010-38519 A | 2/2010 |
| JP | 2011-252625 A | 12/2011 |
| JP | 2013-19666 A | 1/2013 |
| JP | 2014-122743 A | 7/2014 |
| WO | 98/03819 A1 | 1/1998 |
| WO | 0212791 A1 | 2/2002 |
| WO | 200212791 A1 | 2/2002 |
| WO | 2009/130857 A1 | 10/2009 |
| WO | 2009126660 A2 | 10/2009 |

OTHER PUBLICATIONS

International Preliminary Report on Patentability (Form PCT/IB/338) issued in counterpart International Application No. PCT/JP2016/065929 dated Dec. 21, 2017, with Form PCT/IB/373, PCT/ISA/237, PCT/IB/326, with English translation (20 pages).
Office Action dated Jun. 26, 2017, issued in counterpart Taiwanese Application No. 105118247 (11 pages).
Examination Report dated Jun. 18, 2018, issued in counterpart Australian application No. 2016274736. (3 pages).
Office Action dated Oct. 9, 2018, issued in counterpart Chinese application No. 201680024810.8. (10 pages).
Office Action dated Mar. 18, 2019, issued in counterpart EP application No. 16807320.3. (8 pages).
Office Action dated Nov. 26, 2018, issued in counterpart Korean Application No. 10-2017-7032223, with English translation (16 pages).
Extended Search Report dated May 24, 2018, issued in counterpart European Application No. 16807320.3 (25 pages).
Office Action dated Apr. 9, 2019, issued in counterpart JP application No. 2015-119311, with English translation. (11 pages).
Examination Report dated Aug. 1, 2018, issued in counterpart to Canadian Application No. 2,983,989 (9 pages).
The Office Action dated May 8, 2019, issued in counterpart CN application No. 201680024810.8, with English translation. (15 pages).
Office Action dated May 20, 2019, issued in counterpart KR application No. 10-2017-7032223, with English translation. (12 pages).
Office Action dated Sep. 17, 2019, issued in counterpart CN Application No. 201680024810.8, with English translation (19 pages).
Examination Report dated Aug. 14, 2019, issued in counterpart in Application No. 201717038769 (6 pages).

\* cited by examiner

BURNER, COMBUSTION DEVICE, BOILER, AND BURNER CONTROL METHOD

TECHNICAL FIELD

The present disclosure relates to a burner, combustion device, a boiler, and a burner control method.

BACKGROUND ART

A burner for burning solid powder fuel generally includes a fuel supply nozzle through which mixed gas containing solid powder fuel and carrier gas, and a gas passage which is disposed so as to surround the fuel supply nozzle and through which combustion oxygen containing gas flows.

As such a type of burner, Patent Document 1 discloses a burner provided with an air nozzle for inner flame-holding, to feed high-temperature gas in the vicinity of outer peripheral portion of a tip of a fuel supply nozzle into fluid mixture. From the injection opening of the air nozzle for inner flame-holding, an air jet flow is discharged toward the center portion of a fluid mixture nozzle. The air jet flow has entrainment effect. Thus a part of recirculation high-temperature gas enters the flow of fluid mixture along the air jet flow, and enhances the flame holding performance inside the fluid mixture. Furthermore, turbulence of the flow of fluid mixture is increased by the air jet flow, and it is effective to improve the combustion efficiency after ignition.

CITATION LIST

Patent Literature

Patent Document 1: WO98/03819A

SUMMARY

Problems to be Solved

The combustion burner disclosed in Patent Document 1 is provided with an air nozzle for inner flame-holding to feed high-temperature gas in the vicinity of outer peripheral portion of a tip of a fluid mixture nozzle into fluid mixture. However, when the air nozzle for inner flame-holding is provided, the configuration of the burner is more complex, and an additional air supply system for inner flame-holding is required.

In view of the above, an object of at least one embodiment of the present invention is to provide a burner, combustion device, a boiler, and a burner control method, which enhance stable ignition and flame holding performance in an inner flame-holding region with a simple configuration.

Solution to the Problems (1) A burner according to at least one embodiment of the present invention comprises: an inner gas nozzle which extends along an axis while surrounding the axis, and which is capable of supplying a furnace with an inner combustion oxygen containing gas; a fuel supply nozzle which surrounds the inner gas nozzle as seen in a direction along the axis, and which is capable of supplying the furnace with a fluid mixture of a solid powder fuel and a carrier gas; an outer gas nozzle which surrounds the fuel supply nozzle as seen in the direction along the axis, and which is capable of supplying the furnace with an outer combustion oxygen containing gas; and a flow-velocity-ratio adjustment apparatus capable of adjusting a relative flow velocity ratio of a discharge flow velocity of the inner combustion oxygen containing gas to a discharge flow velocity of the outer combustion oxygen containing gas. At downstream of an outlet of the fuel supply nozzle, flame holding regions are formed on a side of a discharge flow of the inner combustion oxygen containing gas and a side of a discharge flow of the outer combustion oxygen containing gas, respectively, around a discharge flow of the fluid mixture. [0006] Inner circulation eddies are formed between a discharge flow of the fluid mixture discharged from the fuel supply nozzle and a discharge flow of the inner combustion oxygen containing gas. When the inner circulation eddies are enhanced, the inner circulation eddies increase the flow rate of an inner high-temperature gas circulation flow flowing toward the fuel supply nozzle, which makes it possible to stabilize ignition and flame holding in the inner flame holding region on the side of the discharge flow of the inner combustion oxygen containing gas with heat of the inner high-temperature gas circulation flow.

Furthermore, an outer circulation eddies are formed between a discharge flow of the fluid mixture discharged from the fuel supply nozzle and a discharge flow of the outer combustion oxygen containing gas. When the outer circulation eddies are enhanced, the outer circulation eddies increase the flow rate of an outer high-temperature gas circulation flow flowing toward the fuel supply nozzle, which makes it possible to stabilize ignition and flame holding in the outer flame holding region on the side of the discharge flow of the outer combustion oxygen containing gas with heat of the outer high-temperature gas circulation flow.

Herein, ignition and flame holding are more easily stabilized in the outer flame holding region than in the inner flame holding region, due to radiation from surrounding area, for instance. Thus, discharge flow velocity of the inner combustion oxygen containing gas and discharge flow velocity of the outer combustion oxygen containing gas required to stabilize ignition and flame holding in each of the inner flame holding region and the outer flame holding region are not necessarily the same. In this regard, with the above configuration (1), the flow-velocity-ratio adjustment apparatus adjusts the relative flow velocity ratio of the discharge flow velocity of the inner combustion oxygen containing gas to the discharge flow velocity of the outer combustion oxygen containing gas, and thereby ignition and flame holding can be stabilized in each of the inner flame holding region and the outer flame holding region.

(2) A burner according to at least one embodiment of the present invention comprises: an inner gas nozzle which extends along an axis while surrounding the axis, and which is capable of supplying a furnace with an inner combustion oxygen containing gas; a fuel supply nozzle which surrounds the inner gas nozzle as seen in a direction along the axis, and which is capable of supplying the furnace with a fluid mixture of a solid powder fuel and a carrier gas; an outer gas nozzle which surrounds the fuel supply nozzle as seen in the direction along the axis, and which is capable of supplying the furnace with an outer combustion oxygen containing gas; an inner flame holder disposed on an outlet section of the inner gas nozzle and configured to contract a flow of the inner combustion oxygen containing gas; an outer flame holder disposed on an outlet section of the outer gas nozzle and configured to deviate a flow of the outer combustion oxygen containing gas from the axis; and a flow-velocity-ratio adjustment apparatus capable of adjusting a relative flow velocity ratio of a discharge flow velocity of the inner combustion oxygen containing gas to a discharge flow velocity of the outer combustion oxygen containing gas.

In the above configuration (2), the inner flame holder contracts the flow of the inner combustion oxygen containing gas and thereby the inner circulation eddies are more easily formed between the discharge flow of the inner combustion oxygen containing gas and the discharge flow of the fluid mixture. Furthermore, the outer flame holder deviates the discharge flow of the outer combustion oxygen containing gas from the axis so that the flow of the outer combustion oxygen containing gas spreads out, and thereby the outer circulation eddies are more likely to be formed between the discharge flow of the outer combustion oxygen containing gas and the discharge flow of the fluid mixture. Accordingly, it is possible to stabilize ignition and flame holding in each of the inner flame holding region and the outer flame holding region.

(3) In some embodiments, in the above configuration (1) or (2), the burner further comprises plurality of intermediate flame holders provided between an outlet section of the inner gas nozzle and an outlet section of the outer gas nozzle so as to intersect an outlet section of the fuel supply nozzle.

With the above configuration (3), the intermediate flame holders provided so as to intersect the outlet section of the fuel supply nozzle, and thereby high-temperature gas can flow along the intermediate flame holders from the outer flame holding region toward the inner flame holding region. Accordingly, it is possible to increase temperature of the inner flame holding region, and to further stabilize ignition and flame holding in the inner flame holding region.

(4) In some embodiments, in any one of the above configurations (1) to (3), the burner is configured such that the discharge flow velocity of the inner combustion oxygen containing gas is higher than the discharge flow velocity of the outer combustion oxygen containing gas.

With the above configuration (4), the discharge flow velocity of the inner combustion oxygen containing gas is higher than the discharge flow velocity of the outer combustion oxygen containing gas, and thereby pressure in the inner flame holding region is lower than pressure in the outer flame holding region, which makes it easier for high-temperature gas to flow from the outer flame holding region toward the inner flame holding region, which makes it possible to stabilize ignition and flame holding in the inner flame holding region reliably.

(5) In some embodiments, in any one of the above configurations (1) to (4), the outer gas nozzle includes two or more outer gas flow passages surrounding the fuel supply nozzle as seen in the direction along the axis, and the outer combustion oxygen containing gas is capable of being supplied to the furnace through the two or more outer gas flow passages.

With the above configuration (5), the outer combustion oxygen containing gas is supplied through the two or more outer gas flow passages, which makes it possible to make the flow velocity and the direction of the outer combustion oxygen containing gas have a variation, and thereby to stabilize ignition and flame holding even further in each of the inner flame holding region and the outer flame holding region.

(6) In some embodiments, in the above configuration (5), the burner further comprises an outer gas flow-rate regulator provided for at least one of the two or more outer gas flow passages.

With the above configuration (6), the outer gas flow-rate regulator makes it possible to regulate the flow rate of the outer combustion oxygen containing gas flowing out from the outer gas flow passage having the outer gas flow-rate regulator disposed therein, which makes it possible to stabilize ignition and flame holding even further in each of the inner flame holding region and the outer flame holding region.

(7) In some embodiments, in any one of the above configurations (1) to (6), the inner gas nozzle includes two or more inner gas flow passages each of which surrounds the axis as seen in the direction along the axis. The burner further comprises a flow-rate regulator capable of regulating the flow rate of the inner combustion oxygen containing gas flowing through an innermost combustion gas supply flow passage disposed innermost as seen in the direction along the axis from among the two or more inner gas flow passages.

With the above described configuration (7), the flow rate of the inner combustion oxygen containing gas flowing through the innermost combustion gas supply flow passage is regulated, and thereby it is possible to maintain the reducing condition in the inner flame holding region regardless of the characteristics of the solid powder fuel, and to suppress generation of NOx.

(8) In some embodiments, in any one of the above configurations (1) to (7), the burner further comprises control equipment capable of automatically controlling the flow-velocity-ratio adjustment apparatus.

With the above configuration (8), the control equipment automatically controls the flow-velocity-ratio adjustment apparatus, and thereby it is possible to stabilize ignition and flame holding in each of the inner flame holding region and the outer flame holding region easily and reliably.

(9) In some embodiments, in the above configuration (8), the burner further comprises a pressure sensor disposed on an outlet section of the inner gas nozzle or an outlet section of the outer gas nozzle. The control equipment is capable of controlling the flow-velocity-ratio adjustment apparatus on the basis of an output of the pressure sensor.

With the above described configuration (9), the control equipment controls the flow-velocity-ratio adjustment apparatus on the basis of the output of the pressure sensor, and thereby it is possible to stabilize ignition and flame holding in the inner flame holding region and the outer flame holding region easily and reliably.

(10) In some embodiments, in any one of the above configurations (1) to (9), the burner further comprises at least one of: an inner flame holder disposed on an outlet section of the inner gas nozzle and configured to contract a flow of the inner combustion oxygen containing gas; an outer flame holder disposed on an outlet section of the outer gas nozzle and configured to deviate a flow of the outer combustion oxygen containing gas from the axis; or plurality of intermediate flame holders provided between an outlet section of the inner gas nozzle and an outlet section of the outer gas nozzle so as to intersect an outlet section of the fuel supply nozzle; and a guide member capable of guiding at least a part of the inner combustion oxygen containing gas, the outer combustion oxygen containing gas, or the fluid mixture, along a furnace-side surface of the at least one flame holder.

With the above configuration (10), a part of the inner combustion oxygen containing gas, the outer combustion oxygen containing gas, or the fluid mixture flows along the furnace-side surface of the at least one of the inner flame holder, the outer flame holder, or the intermediate flame holders, and thereby it is possible to cool the at least one flame holder, and to suppress adhesion of ash to the flame holder.

(11) A combustion device according to at least one embodiment of the present invention comprises: a wind box; and the burner according to any one of the above (1) to (10) covered with the wind box.

The above combustion device (11) is provided with the burner according to any one of the above (1) to (10), and thereby it is possible to stabilize ignition and flame holding in each of the inner flame holding region and the outer flame holding region.

(12) A boiler according to at least one embodiment of the present invention comprises: a furnace; a wind box mounted to the furnace; and the burner according to any one of the above (1) to (10) mounted to the furnace and covered with the wind box.

The above boiler having the above configuration (12) is provided with the burner according to any one of the above (1) to (10), and thereby it is possible to stabilize ignition and flame holding in each of the inner flame holding region and the outer flame holding region.

(13) A method of controlling a burner according to at least one embodiment of the present invention is for a burner which comprises: an inner gas nozzle which extends along an axis while surrounding the axis, and which is capable of supplying a furnace with an inner combustion oxygen containing gas; a fuel supply nozzle which surrounds the inner gas nozzle as seen in a direction along the axis, and which is capable of supplying the furnace with fluid mixture of a solid powder fuel and a carrier gas; an outer gas nozzle which surrounds the fuel supply nozzle as seen in the direction along the axis, and which is capable of supplying the furnace with an outer combustion oxygen containing gas; and a flow-velocity-ratio adjustment apparatus capable of adjusting a relative flow velocity ratio of a discharge flow velocity of the inner combustion oxygen containing gas to a discharge flow velocity of the outer combustion oxygen containing gas, wherein, at downstream of an outlet of the fuel supply nozzle, flame holding regions are formed on a side of a discharge flow of the inner combustion oxygen containing gas and a side of a discharge flow of the outer combustion oxygen containing gas, respectively, around a discharge flow of the fluid mixture, wherein the inner gas nozzle includes two or more inner gas flow passages each of which surrounds the axis as seen in the direction along the axis, and wherein the burner further comprises a flow-rate regulator capable of regulating the flow rate of the inner combustion oxygen containing gas flowing through an innermost combustion gas supply flow passage disposed innermost as seen in the direction along the axis from among the two or more inner gas flow passages, and the method comprises: setting an opening of the flow-rate regulator to be smaller when fuel ratio of the solid powder fuel is higher than a threshold, than an opening when the fuel ratio of the solid powder fuel is not higher than the threshold.

According to the above burner control method (13), the opening of the flow-rate regulator is set to be smaller in a case where the fuel ratio exceeds the threshold than in a case where the fuel ratio is not higher than the threshold, and thereby it is possible to reduce the flow rate (total flow rate) of the inner combustion oxygen containing gas while maintaining the discharge flow velocity of the inner combustion oxygen containing gas. As a result, it is possible to maintain the inner flame holding region and to suppress generation of NOx.

(14) In some embodiments, in the above configuration (13), the burner further comprises an outer gas flow-rate regulator capable of regulating a flow rate of the outer combustion oxygen containing gas, and the method comprises setting an opening of the outer gas flow-rate regulator to be larger when the fuel ratio of the solid powder fuel is higher than the threshold than when the fuel ratio of the solid powder fuel is not higher than the threshold.

According to the above configuration (14), the opening of the outer gas flow-rate regulator is set to be larger in a case where the fuel ratio exceeds the threshold than in a case where the fuel ratio of the solid powder fuel is not higher than the threshold, and thereby it is possible to suppress an increase in the discharge flow velocity of the outer combustion oxygen containing gas. As a result, a difference is ensured between the discharge flow velocity of the outer combustion oxygen containing gas and the discharge flow velocity of the inner combustion oxygen containing gas, and thereby it is possible to maintain the inner flame holding region more reliably and to suppress generation of NOx.

(15) In some embodiments, in the above configuration (14), the outer gas nozzle includes two or more outer gas flow passages surrounding the fuel supply nozzle as seen in the direction along the axis. The outer combustion oxygen containing gas is capable of being supplied to the furnace through the two or more outer gas flow passages. The outer gas flow-rate regulator is capable of regulating a flow rate of the outer combustion oxygen containing gas in an outermost outer gas flow passage. The method comprises setting the opening of the outer gas flow-rate regulator to be larger when the fuel ratio of the solid powder fuel is higher than the threshold than when the fuel ratio of the solid powder fuel is not higher than the threshold.

With the above configuration (15), the outer gas flow-rate regulator is capable of regulating the flow rate of the outer combustion oxygen containing gas in the outermost outer gas flow passage, and the opening of the outer gas flow-rate regulator is set to be larger in a case where the fuel ratio exceeds the threshold than in a case where the fuel ratio is not higher than the threshold. In contrast, the opening of the outer gas flow-rate regulator is set to be smaller in a case where the fuel ratio is not higher than the threshold than in a case where the fuel ratio is higher than the threshold. Accordingly, the opening of the outer gas flow-rate regulator is set to be smaller in a case where the fuel ratio is not higher than the threshold, and thereby it is possible maintain the discharge flow velocity of the outer combustion oxygen containing gas even if the total flow rate of the outer combustion oxygen containing gas decreases. As a result, it is possible to prevent the outer circulation eddies from becoming weak, and to ensure stability of ignition and flame holding in the outer flame holding region.

Advantageous Effects

According to at least one embodiment of the present invention, it is possible to provide a burner, a combustion device, a boiler, and a burner control method, which are capable of stabilizing ignition and flame holding in an interior flame holding region with a simple configuration.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
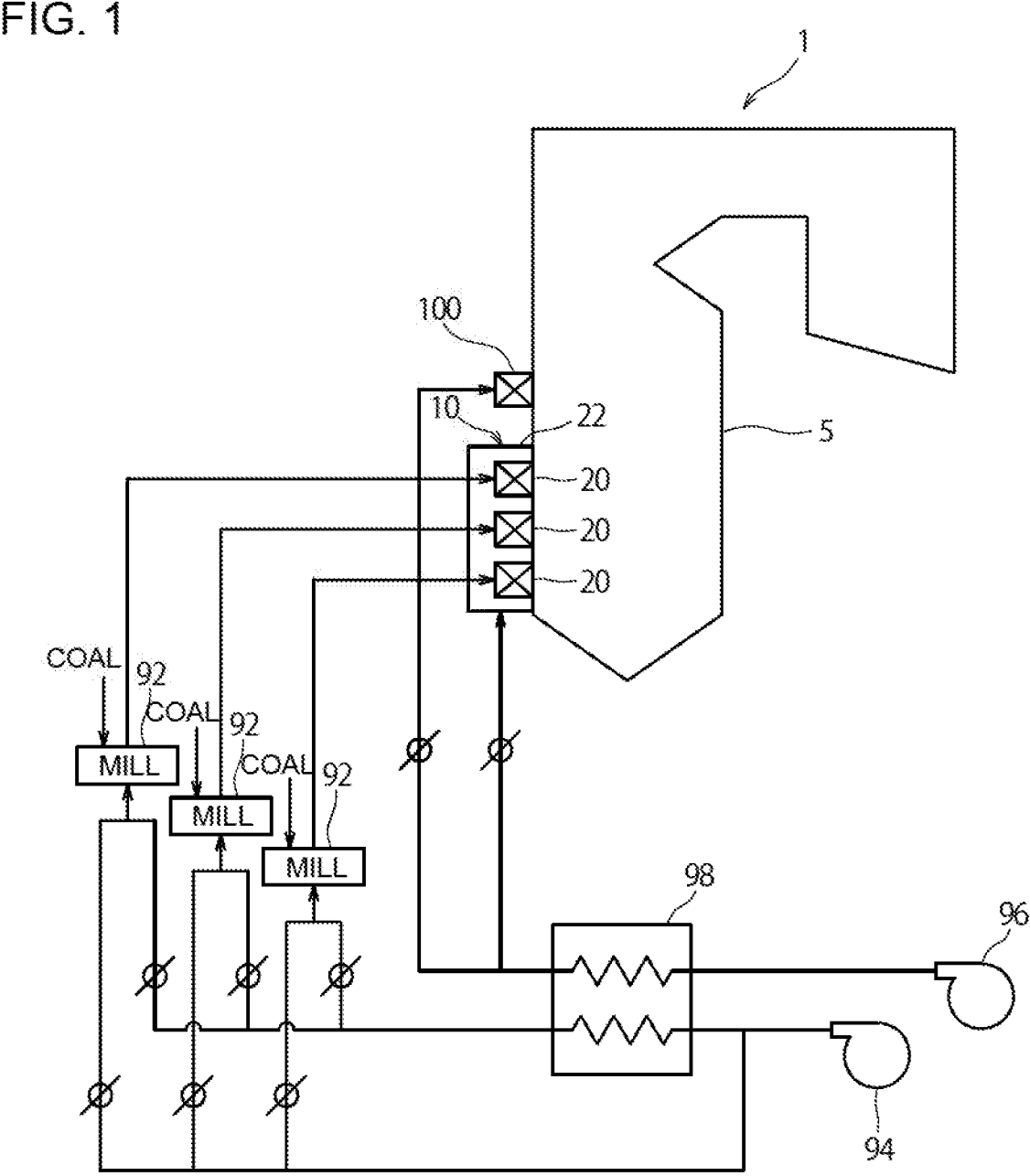
FIG. 1 is a schematic configuration diagram of a boiler according to an embodiment of the present invention.

FIG. 1 is a schematic configuration diagram of a boiler 1 according to an embodiment of the present invention. As shown in FIG. 1, the boiler 1 includes a furnace 5 and a combustion device 10 mounted to the furnace 5. The combustion device 10 is capable of supplying the furnace 5 with solid powder fuel and oxygen containing gas. The solid powder fuel is combusted inside the furnace 5, and thereby high-temperature gas (combustion gas) is produced. The high-temperature gas heats water that serves as a heat medium via a heat exchanger such as an economizer, a super-heater, and a re-heater (not shown), and utilizes steam obtained therefrom to operate a turbine generator (not shown), for instance.

The solid powder fuel is, for instance a powdered fuel obtained by pulverizing coal, oil coke, solid biomass, or combination thereof.

The combustion device 10 includes at least one burner 20 that can be attached to the furnace 5, and a wind box 22 that can be attached to the furnace 5 so as to surround the burner 20.

Figure 2:
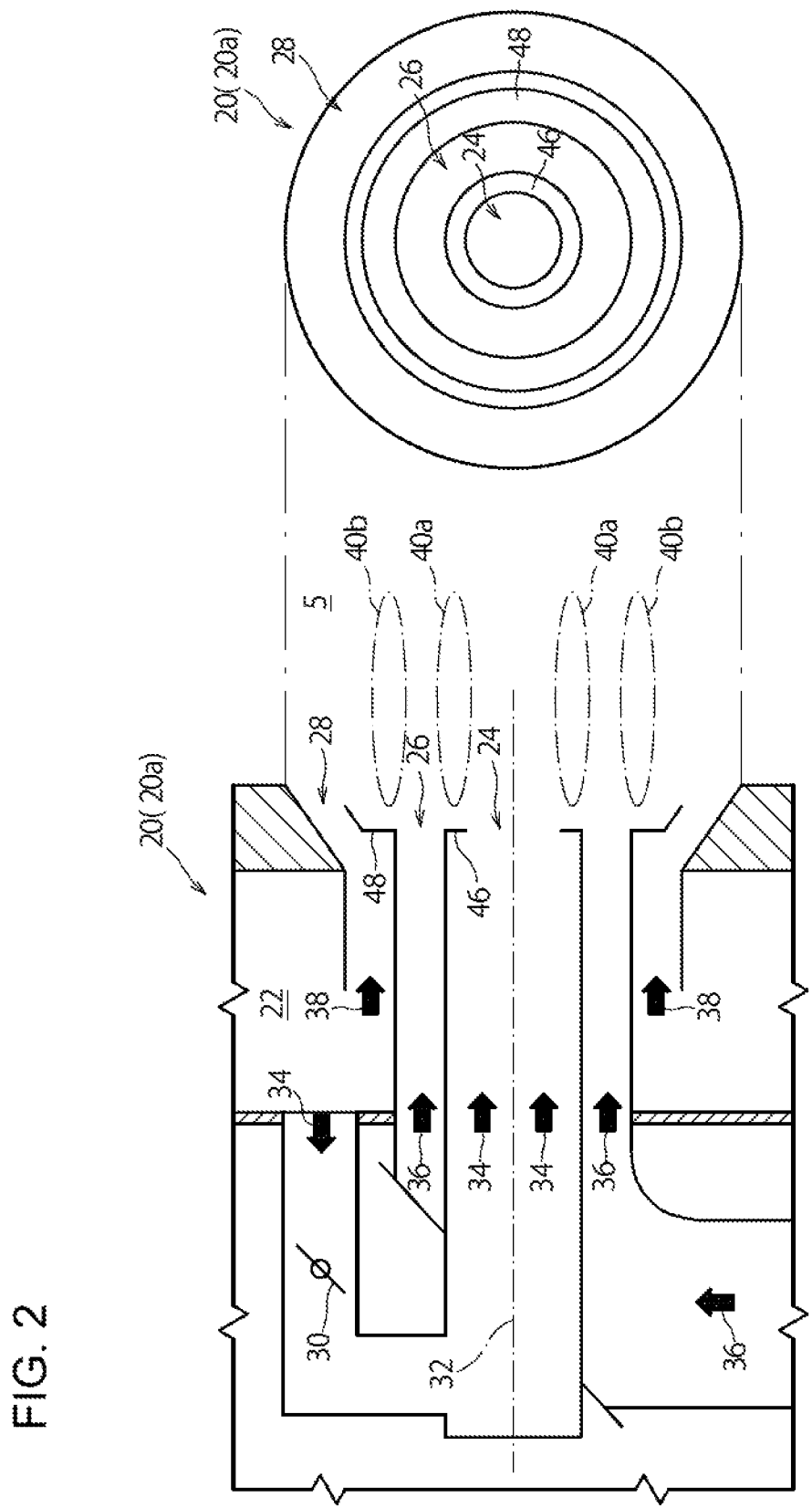
FIG. 2 is a cross-sectional view and a front view schematically showing a burner according to an embodiment of the present invention, mounted to a furnace.
Figure 3:
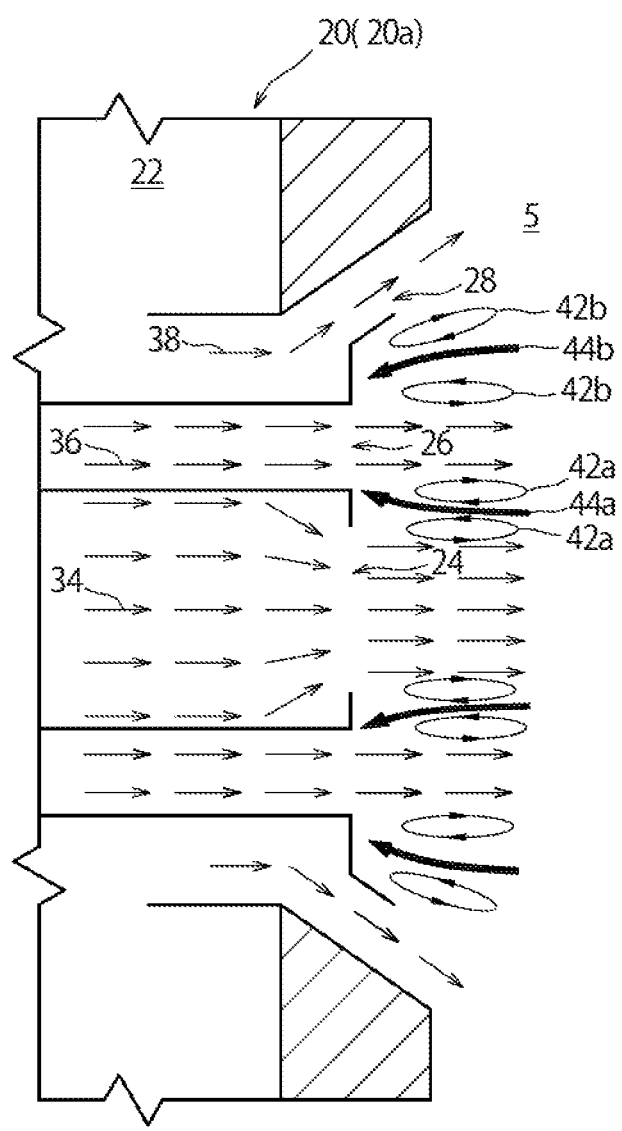
FIG. 3 is a diagram for describing the function of a burner according to an embodiment of the present invention.
Figure 4:
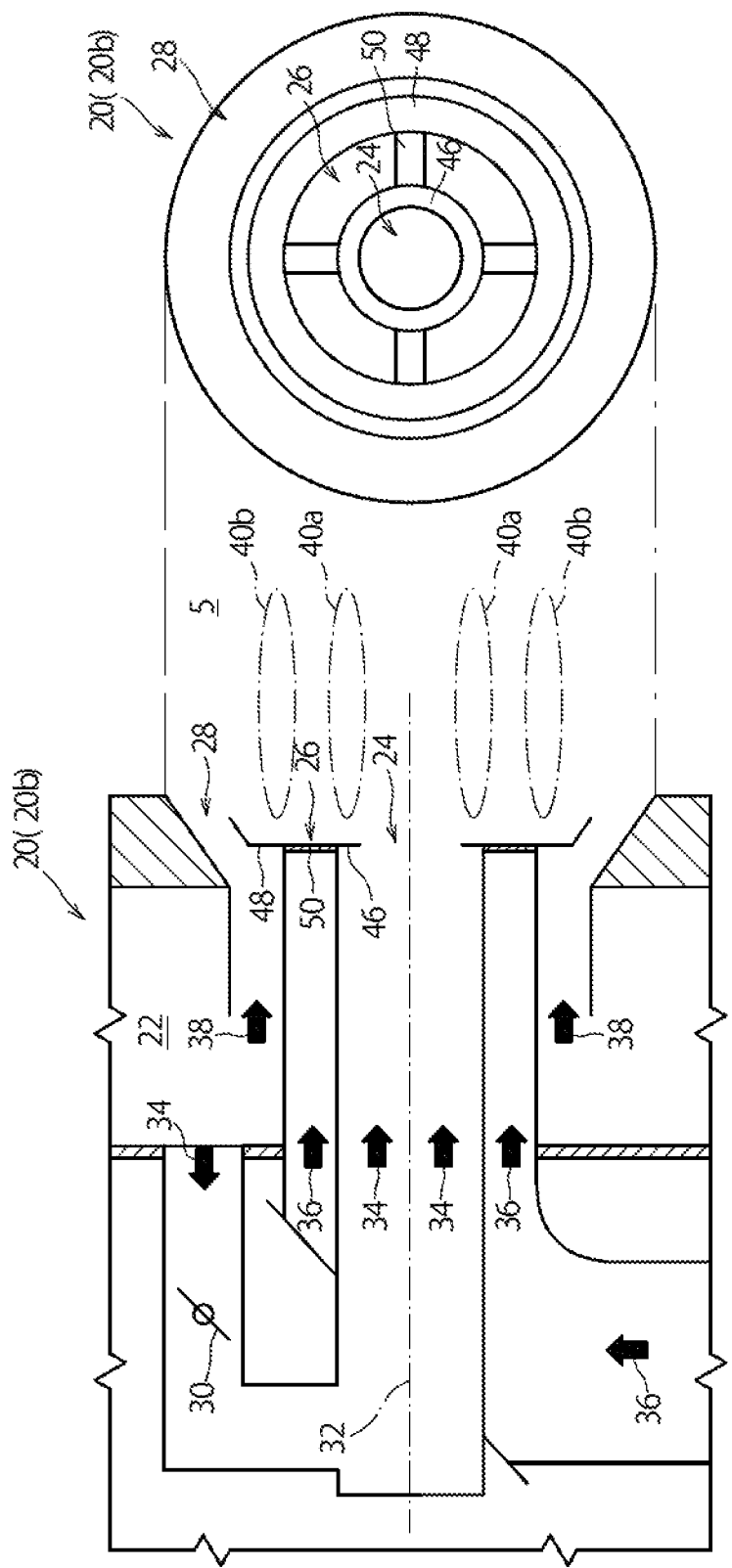
FIG. 4 is a cross-sectional view and a front view schematically showing a burner according to another embodiment of the present invention, mounted to a furnace.
Figure 5:
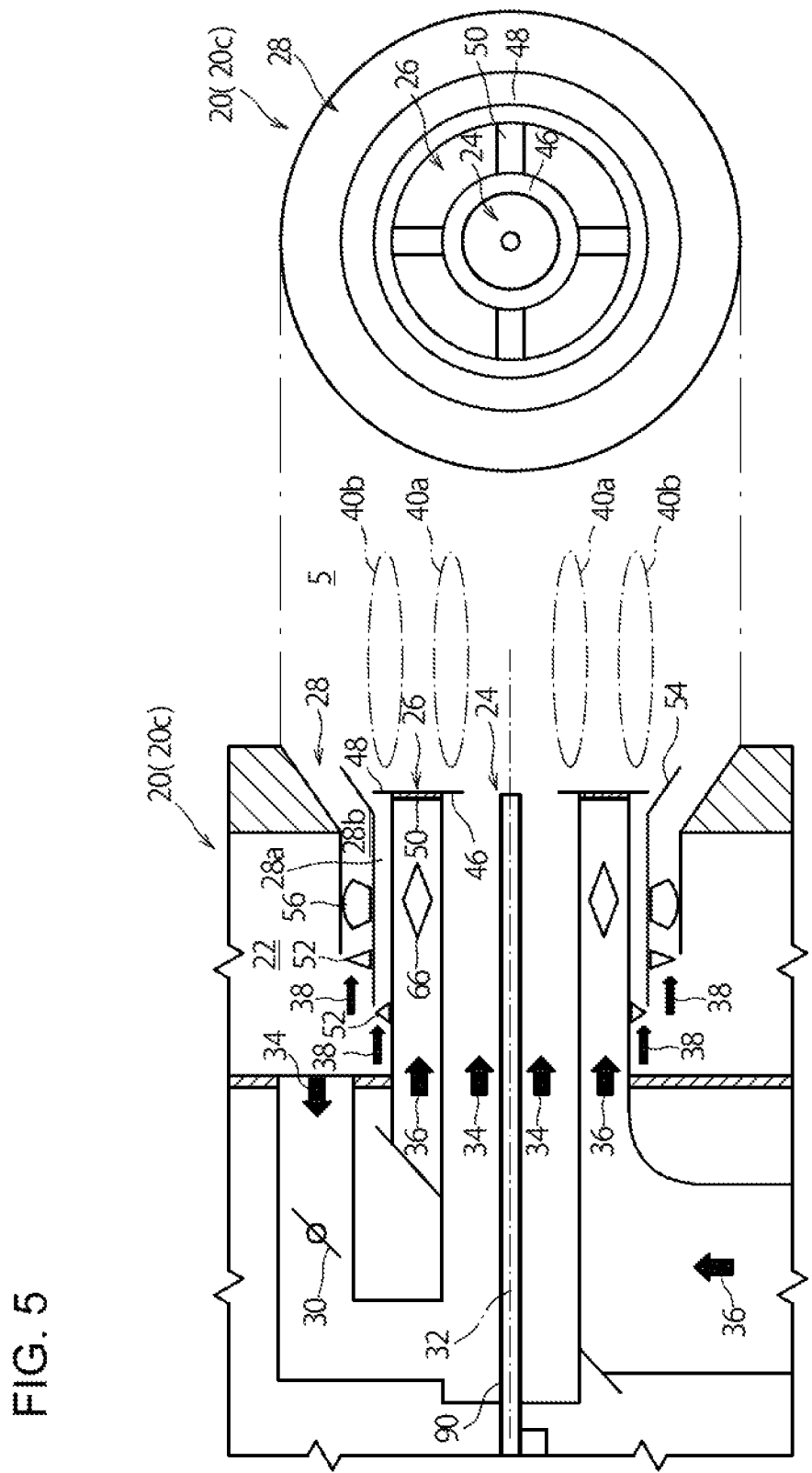
FIG. 5 is a cross-sectional view and a front view schematically showing a burner according to another embodiment of the present invention, mounted to a furnace.
Figure 6:
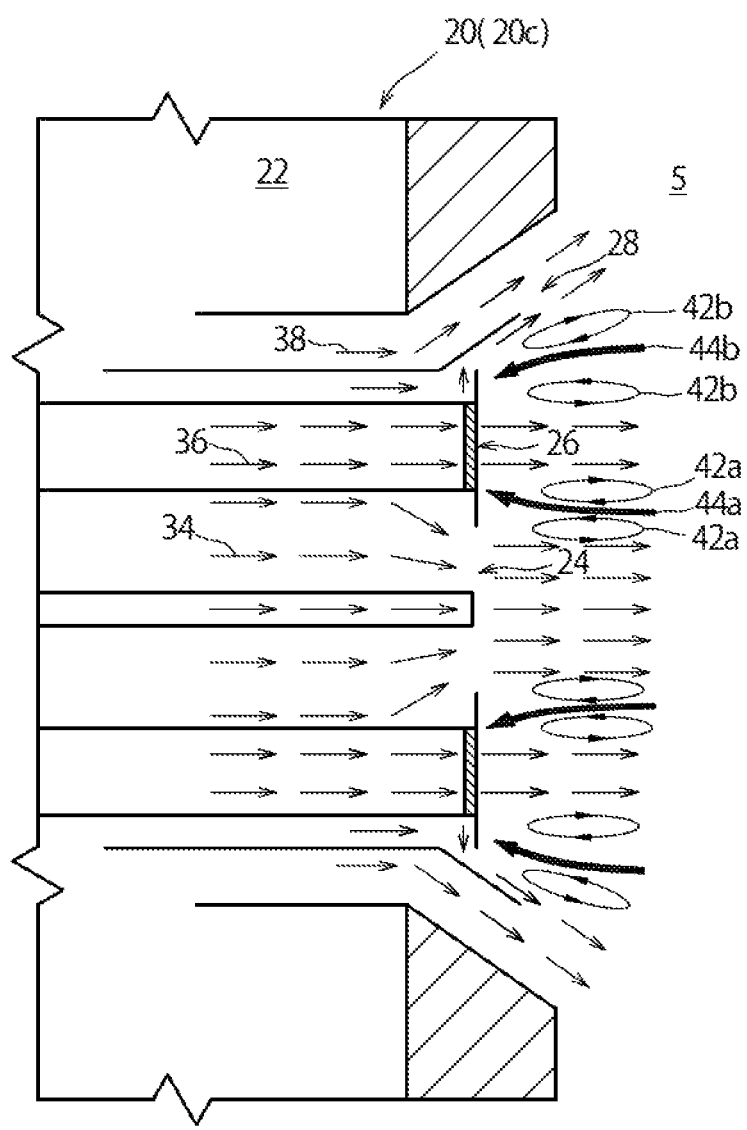
FIG. 6 is a diagram for describing the function of a burner according to an embodiment of the present invention.
Figure 7:
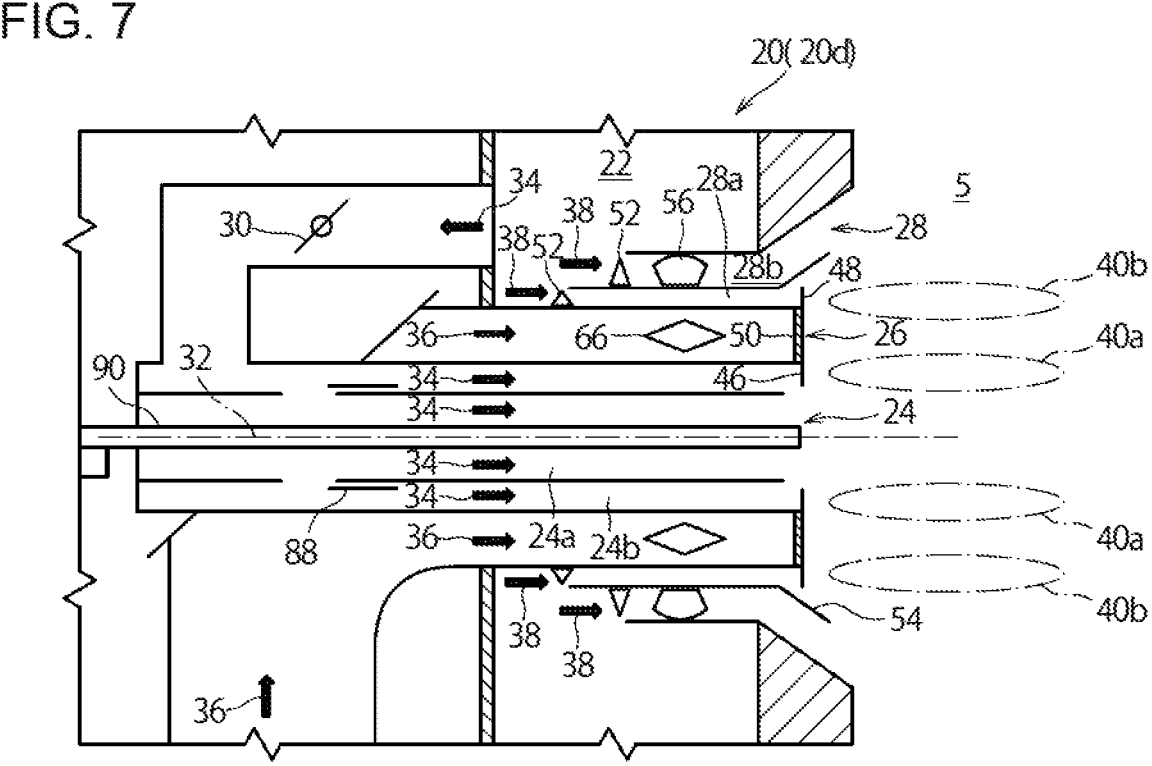
FIG. 7 is a cross-sectional view schematically showing a burner according to another embodiment of the present invention, mounted to a furnace.
Figure 8:
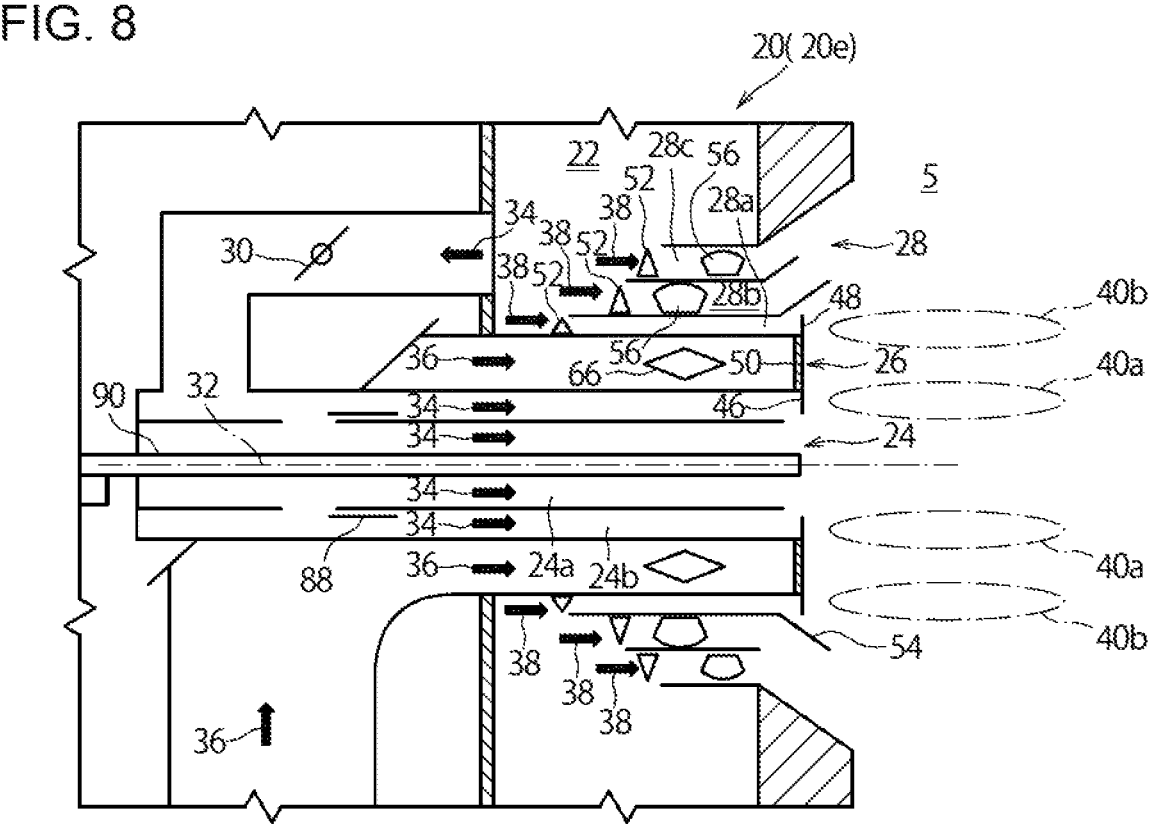
FIG. 8 is a cross-sectional view schematically showing a burner according to another embodiment of the present invention, mounted to a furnace.
Figure 9:
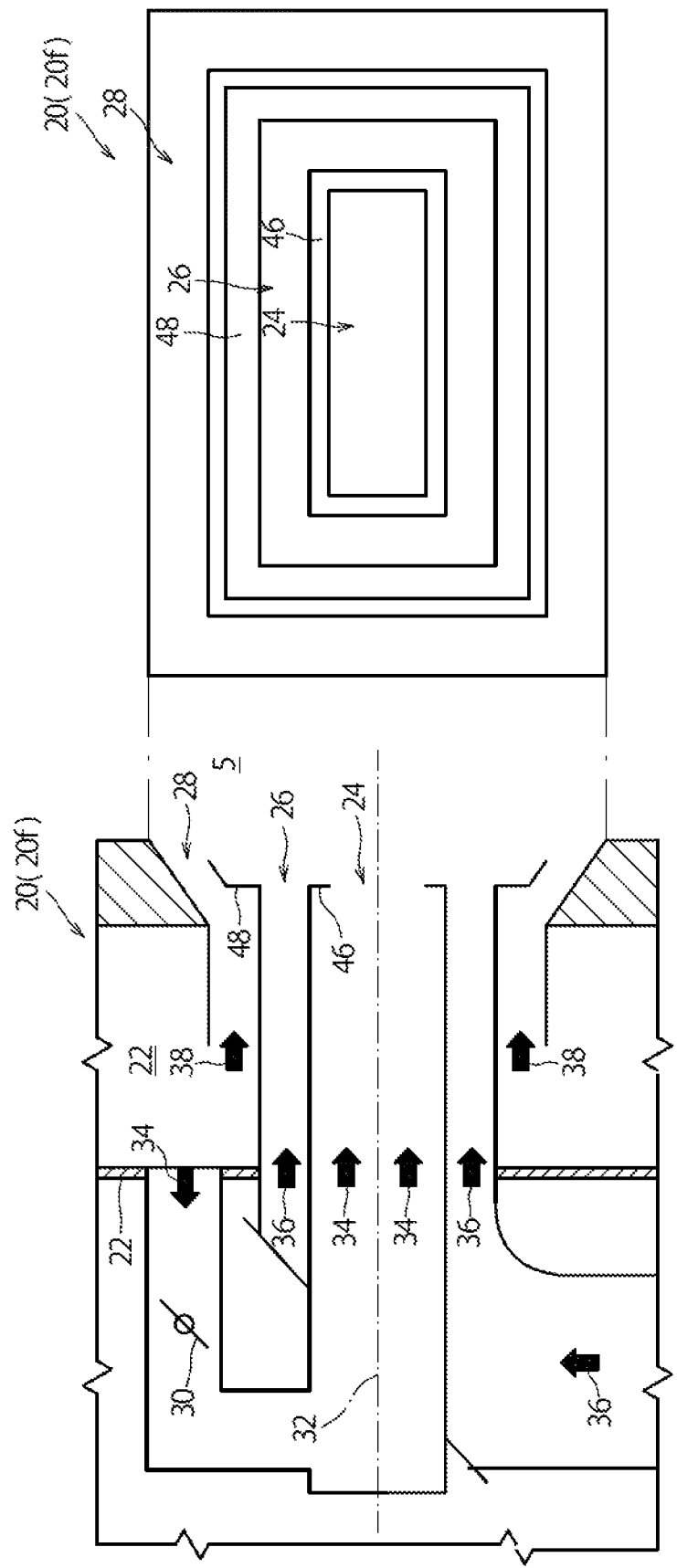
FIG. 9 is a cross-sectional view and a front view schematically showing a burner according to another embodiment of the present invention, mounted to a furnace.

FIG. 2 is a cross-sectional view and a front view schematically showing a burner 20 (20a) according to an embodiment of the present invention, mounted to the furnace 5. FIG. 3 is a block diagram for describing the function of the burner 20a. FIGS. 4 and 5 are a cross-sectional view and a front view schematically showing a burner 20 (20b, 20c) according to another embodiment of the present invention, mounted to the furnace 5. FIG. 6 is a block diagram for describing the function of the burner 20c. FIGS. 7 and 8 are each a cross-sectional view schematically showing a burner 20 (20d, 20e) according to another embodiment of the present invention, mounted to the furnace 5. FIG. 9 is a cross-sectional view and a front view schematically showing a burner 20 (20f) according to another embodiment of the present invention, mounted to the furnace 5.

As shown in each of FIGS. 2, 4, 5, and 7 to 9, the burner 20 (20a to 20f) includes an inner gas nozzle 24, a fuel supply nozzle 26, an outer gas nozzle 28, and a flow-velocity-ratio adjustment apparatus 30.

The inner gas nozzle 24 extends along an axis 32 while surrounding the axis 32, and is capable of supplying the furnace 5 with an inner combustion oxygen containing gas 34. The axis 32 may be perpendicular or inclined with respect to the outer wall of the furnace 5. The inner combustion oxygen containing gas 34 is air, for instance. Further, for instance, in a case where oxygen combustion is applied, in which exhaust gas is recirculated and mixed with oxygen to be used as a combustion gas, the combustion oxygen containing gas is a mixed gas mainly containing carbon dioxide and oxygen.

The fuel supply nozzle 26 surrounds the inner gas nozzle 24 as seen in a direction along the axis 32, and is capable of supplying the furnace 5 with fluid mixture 36 of solid powder fuel and carrier gas. The solid powder fuel is powdered coal, for instance, and the carrier gas is air, for instance.

The outer gas nozzle 28 surrounds the fuel supply nozzle 26 as seen in a direction along the axis 32, and is capable of supplying the furnace 5 with an outer combustion oxygen containing gas 38. The outer combustion oxygen containing gas 38 is air, for instance.

The flow-velocity-ratio adjustment apparatus 30 is capable of adjusting the relative flow velocity ratio of a discharge flow velocity Fc of the inner combustion oxygen containing gas 34 to a discharge flow velocity Fo of the outer combustion oxygen containing gas 38.

Furthermore, the burner 20 is configured such that, at downstream of the outlet of the fuel supply nozzle 26, an inner flame holding region 40a and an outer flame holding region 40b are formed on the side closer to the inner combustion oxygen containing gas 34 and the side closer to the outer combustion oxygen containing gas 38, respectively, of the discharge flow of the fluid mixture 36. The inner flame holding region 40a and the outer flame holding region 40b are regions in which the solid powder fuel is ignited and combusted. The inner flame holding region 40a and the outer flame holding region 40b are formed immediately downstream the outlet of the fuel supply nozzle 26.

In a case where the above burner 20 is used, as shown in FIG. 3 or 6, an inner circulation eddies 42a are formed between the fluid mixture 36 discharged from the fuel supply nozzle 26 and the inner combustion oxygen containing gas 34 discharged from the inner gas nozzle 24. When the inner circulation eddies 42a are enhanced, the inner circulation eddies 42a increase the flow rate of a flow of high-temperature gas (inner high-temperature gas circulation flow 44a) flowing toward the fuel supply nozzle 26, which makes it possible to stabilize ignition and flame holding in the inner flame holding region 40a on the side of the inner combustion oxygen containing gas 34 with heat of the inner high-temperature gas circulation flow 44a.

Furthermore, an outer circulation eddies 42b are formed between the fluid mixture 36 discharged from the fuel supply nozzle 26 and the outer combustion oxygen containing gas 38 discharged from the outer gas nozzle 28. When the outer circulation eddies 42b are enhanced, the outer circulation eddies 42b increase the flow rate of a flow of high-temperature gas (outer high-temperature gas circulation flow 44b) flowing toward the fuel supply nozzle 26, which makes it possible to stabilize ignition and flame holding in the outer flame holding region 40b on the side of the outer combustion oxygen containing gas 38 with heat of the outer high-temperature gas circulation flow 44b.

Herein, ignition and flame holding are more easily stabilized in the outer flame holding region 40b than in the inner flame holding region 40a, due to radiation from surrounding area, for instance. Thus, the discharge flow velocity Fc of the inner combustion oxygen containing gas 34 and the discharge flow velocity Fo of the outer combustion oxygen containing gas 38 required to stabilize ignition and flame holding in the inner flame holding region 40a and the outer flame holding region 40b, respectively, are not necessarily the same. In this regard, with the above burner 20, the flow-velocity-ratio adjustment apparatus 30 adjusts the relative flow velocity ratio of the discharge flow velocity Fc of the inner combustion oxygen containing gas 34 and the discharge flow velocity Fo of the outer combustion oxygen containing gas 38, and thereby ignition and flame holding are stabilized in each of the inner flame holding region 40a and the outer flame holding region 40b.

If it is possible to adjust the relative flow velocity ratio of the discharge flow velocity Fc of the inner combustion oxygen containing gas 34 to the discharge flow velocity Fo of the outer combustion oxygen containing gas 38, ignition and flame holding can be stabilized in each of the inner flame holding region 40a and the outer flame holding region 40b without providing the inner flame holding air nozzle described in WO98/03819.

In some embodiments, the inner gas nozzle 24, the fuel supply nozzle 26, and the outer gas nozzle 28 have a multi-layered tube structure. The inner gas nozzle 24 is formed by a tube-shaped member, and the inner combustion oxygen containing gas 34 can flow through the inside of the tube-shaped member. The fuel supply nozzle 26 is formed by two tube-shaped members surrounding the inner gas nozzle 24, and the fluid mixture 36 can flow through the gap between the two tube-shaped members. The outer gas nozzle 28 is formed by two tube-shaped members surrounding the fuel supply nozzle 26, and the outer combustion oxygen containing gas 38 can flow through the gap between the two tube-shaped members.

The tube-shaped member (outer wall) of the inner gas nozzle 24 and the tube-shaped member (inner wall) on the inner side of the fuel supply nozzle 26 may be the same member, or may be joined to each other. Similarly, the tube-shaped member (outer wall) on the outer side of the fuel supply nozzle 26 and the tube-shaped member (inner wall) on the inner side of the outer gas nozzle 28 may be the same member, or may be joined to each other.

In the present specification, a tube-shaped member is not limited to the cylindrical shape shown in FIGS. 2, 4, and 5, but includes a polygonal tube shape shown in FIG. 9.

In some embodiments, the burner 20 (20a to 20f) further includes an inner flame holder 46 and an outer flame holder 48, as shown in each of FIGS. 2, 4, 5, and 7 to 9.

The inner flame holder 46 is disposed on an outlet section of the inner gas nozzle 24, and is configured to contract the flow of the inner combustion oxygen containing gas 34.

The outer flame holder 48 is disposed on an outlet section of the outer gas nozzle 28, and is configured so that the flow of the outer combustion oxygen containing gas 38 deviates from the axis 32.

In the above burner 20, the inner flame holder 46 contracts the inner combustion oxygen containing gas 34 and thereby the inner circulation eddies 42a are more easily formed between the discharge flow of the inner combustion oxygen containing gas 34 and the discharge flow of the fluid mixture 36. Furthermore, the outer flame holder 48 deviates the outer combustion oxygen containing gas 38 from the axis 32 so that the outer combustion oxygen containing gas 38 spreads out, and thereby the outer circulation eddies 42b are more easily formed between the discharge flow of the outer combustion oxygen containing gas 38 and the discharge flow of the fluid mixture 36. Accordingly, it is possible to stabilize ignition and flame holding in each of the inner flame holding region 40a and the outer flame holding region 40b.

In a case where the burner 20 is further provided with the inner flame holder 46 and the outer flame holder 48, the burner 20 may not necessarily include other features for forming each of the inner flame holding region 40a and the outer flame holding region 40b.

In some embodiments, the inner flame holder 46 comprises a plate-shaped member extending inward from the periphery of the outlet section of the inner gas nozzle 24.

In some embodiments, the outer flame holder 48 comprises a plate-shaped member extending outward from the periphery of the outlet section of the outer gas nozzle 28.

In the present specification, unless otherwise stated, the inner side refers to the side closer to the axis 32 and the outer side refers to the side farther from the axis 32, with respect to a direction intersecting with the axis 32 (radial direction).

In some embodiments, the flow-velocity-rate adjustment apparatus 30 comprises a damper disposed in a flow passage of the inner combustion oxygen containing gas 34. The inlet of the flow passage of the inner combustion oxygen containing gas 34 has an opening into the interior of the wind box 22, and the outlet of the flow passage of the inner combustion oxygen containing gas 34 comprises the outlet of the inner gas nozzle 24. The inlet of the flow passage of the outer combustion oxygen containing gas 38 has an opening into the interior of the wind box 22, and the outlet of the flow passage of the outer combustion oxygen containing gas 38 comprises the outlet of the outer gas nozzle 28.

With this configuration, the inlets of the flow passage of the inner combustion oxygen containing gas 34 and the flow passage of the outer combustion oxygen containing gas 38 are connected to the wind box 22, which is a shared supply source of gas, and thereby the damper disposed in the flow passage of the inner combustion oxygen containing gas 34 can reliably adjust the relative flow velocity ratio of the discharge flow velocity Fc of the inner combustion oxygen containing gas 34 to the discharge flow velocity Fo of the outer combustion oxygen containing gas 38, with a simple configuration.

In some embodiments, the burner 20b, 20c, 20d, 20e further includes a plurality of intermediate flame holders 50, as shown in each of FIGS. 4, 5, 7, and 8. The plurality of intermediate flame holders 50 extend between the outlet section of the inner gas nozzle 24 and the outlet section of the outer gas nozzle 28 so as to intersect the outlet section of the fuel supply nozzle 26. The plurality of intermediate flame holders 50 are disposed separate from one another as seen in the direction along the axis 32, and the fluid mixture 36 can be discharged from the fuel supply nozzle 26 through the gap between the intermediate flame holders 50.

In the above described burner 20b, 20c, 20d, 20e, the intermediate flame holders 50 extend so as to intersect the outlet section of the fuel supply nozzle 26, and thereby high-temperature gas can flow along the intermediate flame holders 50 from the outer flame holding region 40b toward the inner flame holding region 40a. Accordingly, it is possible to increase the temperature of the inner flame holding region 40a, and to further stabilize ignition and flame holding in the inner flame holding region 40a.

In some embodiments, the intermediate flame holder 50 comprises a plate-shaped member disposed so as to intersect the outlet section of the fuel supply nozzle 26.

In some embodiments, the burner 20 is configured such that the discharge flow velocity Fc of the inner combustion oxygen containing gas 34 is higher than the discharge flow velocity Fo of the outer combustion oxygen containing gas 38.

In the above burner 20, the discharge flow velocity Fc of the inner combustion oxygen containing gas 34 is higher than the discharge flow velocity Fo of the outer combustion oxygen containing gas 38, and thereby the flow rate of high-temperature gas flowing from the outer flame holding region 40b toward the inner flame holding region 40a increases, which makes it possible to stabilize ignition and flame holding in the inner flame holding region 40a reliably.

In some embodiments, as shown in FIGS. 5, 7, and 8, the outer gas nozzle 28 includes two or more outer gas flow passages 28a, 28b, 28c surrounding the fuel supply nozzle 26 as seen in a direction along the axis 32. In this case, the outer combustion oxygen containing gas 38 is supplied to the furnace 5 through the two or more outer gas flow passages 28a, 28b, 28c.

In the above burner 20c, 20d, 20e, the outer combustion oxygen containing gas 38 is supplied through the two or more outer gas flow passages 28a, 28b, 28c, which makes it possible to make the flow velocity and the direction of the outer combustion oxygen containing gas 38 have a distribution, and thereby stabilize ignition and flame holding even further in each of the inner flame holding region 40a and the outer flame holding region 40b.

For instance, the two or more outer gas flow passages 28a, 28b, 28c can be formed by providing one or more tube-shaped member inside the outer gas nozzle 28.

In some embodiments, the burner 20c, 20d, 20e further includes an outer gas flow-rate regulator 52 disposed in at least one of the two or more outer gas flow passages 28a, 28b, 28c.

In the above burner 20c, 20d, 20e, with the outer gas flow-rate regulator 52, it is possible to regulate the flow rate of the outer combustion oxygen containing gas 38 flowing out from the outer gas flow passage having the outer gas flow-rate regulator 52 disposed therein, from among the outer gas flow passages 28a, 28b, 28c. Accordingly, it is possible to stabilize ignition and flame holding even further in each of the inner flame holding region 40a and the outer flame holding region 40b.

For instance, the outer gas flow-rate regulator 52 comprises a variable vane or a damper.

In some embodiments, as shown in FIGS. 5, 7, and 8, the two or more outer gas flow passages 28a, 28b, 28c include the first outer gas flow passage 28a disposed on the side of the fuel supply nozzle 26 as seen in a direction along the axis 32, and the second outer gas flow passage 28b surrounding the fuel supply nozzle 26 via the first outer gas flow passage 28a. Furthermore, the burner 20c, 20d, 20e further comprises a second-outer-gas guide vane 54 disposed on the outlet section of the second outer gas flow passage 28b, and configured to deviate a flow of the outer combustion oxygen containing gas 38 that has passed through the second outer gas flow passage 28b from the axis 32 gradually.

In the above burner 20c, 20d, 20e, the outer combustion oxygen containing gas 38 flowing through the second outer gas flow passage 28b enhances the outer circulation eddies 42b, which make it possible to stabilize ignition and flame holding in the outer flame holding region 40b even further. As the flow of the outer combustion oxygen containing gas 38 widens, the reduction region expands across the inner flame holding region 40a and the outer flame holding region 40b, which suppresses generation of NOx.

In some embodiments, the second-outer-gas guide vane 54 comprises a member having a truncated cone shape.

In some embodiments, as shown in FIGS. 5, 7, and 8, the burner 20c, 20d, 20e further includes a swirl creating apparatus 56 disposed in the second outer gas flow passage 28b.

In the above burner 20c, 20d, 20e, swirl is created to the outer combustion oxygen containing gas 38 flowing through the second outer gas flow passage 28b, thereby enhancing the outer circulation eddies 42b, which make it possible to stabilize ignition and flame holding in the outer flame holding region 40*b* even further. Furthermore, creating swirl to the outer combustion oxygen containing gas 38 flowing through the second outer gas flow passage 28*b* further enhances the outer circulation eddies 42*b*, which further promote stabilization of ignition and flame holding in the outer flame holding region 40*b*, and further expands the reduction region across the inner flame holding region 40*a* and the outer flame holding region 40*b*, thus further suppressing generation of NOx.

The swirl creating apparatus 56 may be fixed, or movable. For instance, the swirl creating apparatus 56 comprises a fixed vane, or a movable vane.

In some embodiments, as shown in FIG. 8, the burner 20*e* further includes a swirl creating apparatus 56 disposed in the third outer gas flow passage 28*c*.

Figure 10:
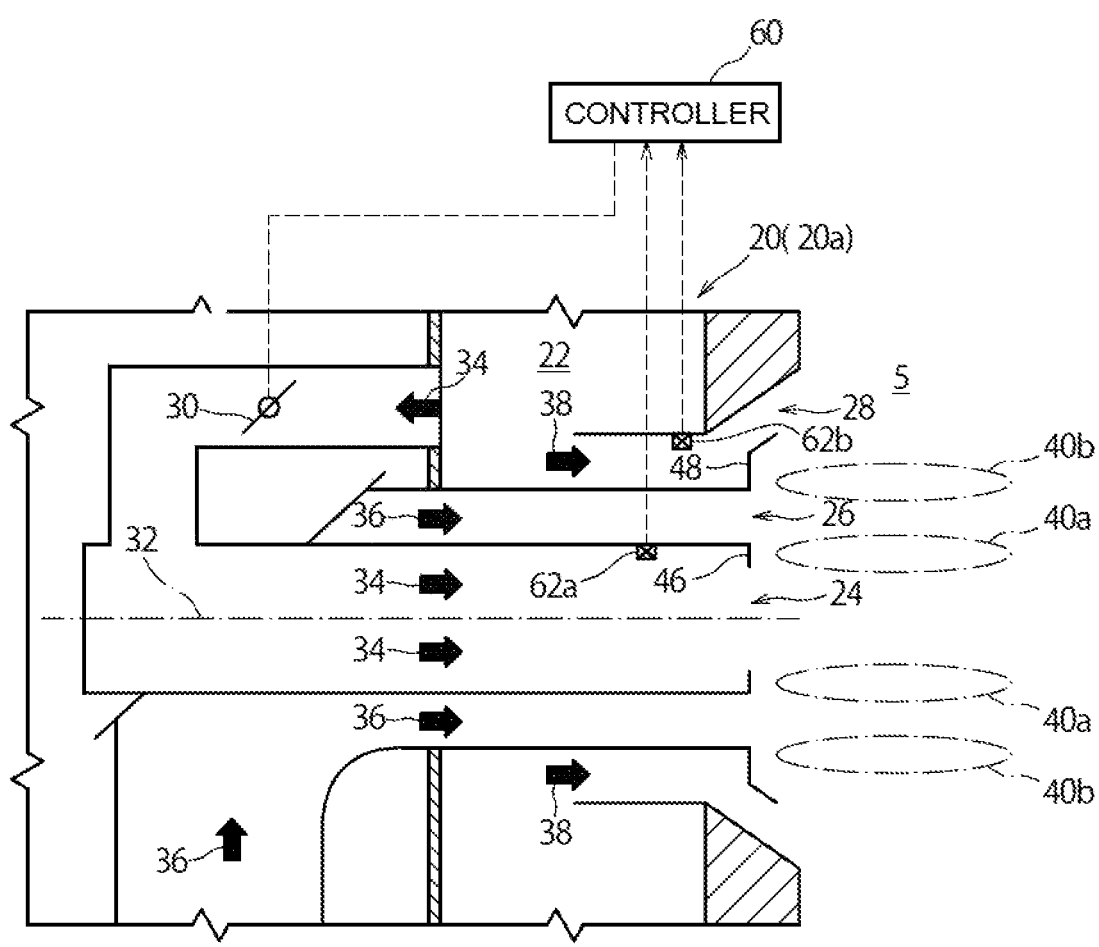
FIG. 10 is a diagram for describing another embodiment, where control equipment is applied to a burner.

FIG. 10 is a diagram for describing another embodiment, where control equipment 60 is applied to the burner 20. In some embodiments, as shown in FIG. 10, the burner 20 further includes control equipment 60. The control equipment 60 is capable of controlling the flow-velocity-ratio adjustment apparatus 30 automatically.

In the above described burner 20, the control equipment 60 automatically controls the flow-velocity-ratio adjustment apparatus 30, and thereby it is possible to stabilize ignition and flame holding in each of the inner flame holding region 40*a* and the outer flame holding region 40*b* easily and reliably.

In some embodiments, as shown in FIG. 10, the burner 20 further includes pressure sensors 62*a*, 62*b* disposed on the outlet section of the inner gas nozzle 24 or the outlet section of the outer gas nozzle 28. The control equipment 60 is capable of controlling the flow-velocity-ratio adjustment apparatus 30 on the basis of the outputs of the pressure sensors 62*a*, 62*b*.

In the above described burner 20, the control equipment 60 controls the flow-velocity-ratio adjustment apparatus 30 on the basis of the outputs of the pressure sensors 62*a*, 62*b*, and thereby it is possible to stabilize ignition and flame holding in each of the inner flame holding region 40*a* and the outer flame holding region 40*b* easily and reliably.

In some embodiments, the control equipment 60 comprises a computer. The control equipment 60 is capable of controlling the flow-velocity-ratio adjustment apparatus 30 via a driving device (not shown). The driving device comprises, for instance, an electromagnetic actuator or a hydraulic actuator.

In some embodiments, as shown in FIGS. 5, 7, and 8, the burner 20*c*, 20*d*, 20*e* further includes a concentrator 66. The concentrator 66 is disposed inside the fuel supply nozzle 26, and configured to form regions with a relatively high concentration of solid powder fuel, on the side of the inner combustion oxygen containing gas 34 and the side of the outer combustion oxygen containing gas 38 of a flow of the fluid mixture 36, at the outlet section of the fuel supply nozzle 26. That is, the concentrator 66 is configured to form regions with a relatively high concentration of solid powder fuel at the inner side and the outer side of the flow of the fluid mixture 36, compared to that in the intermediate section between the inner side and the outer side.

With the above burner 20*c*, 20*d*, 20*e*, the concentrator 66 can form regions with a high concentration of solid powder fuel on the side of the inner combustion oxygen containing gas 34 and the side of the outer combustion oxygen containing gas 38, and thereby it is possible to stabilize ignition and flame holding even further in each of the inner flame holding region 40*a* and the outer flame holding region 40*b*.

In some embodiments, the concentrator 66 is a member disposed so as to surround the inner wall of the fuel supply nozzle 26, comprising a member disposed between the inner wall and the outer wall of the fuel supply nozzle 26, so as to have a gap from each of the inner wall and the outer wall. With such a member, it is possible to separate the fluid mixture 36 to the inner wall side and the outer wall side, and thereby it is possible to distribute more solid powder fuel, which has a greater specific weight than the carrier gas, to the inner wall side and the outer wall side.

For instance, the concentrator 66 comprises an annular member, and is supported by a support member (not shown).

Figure 11:
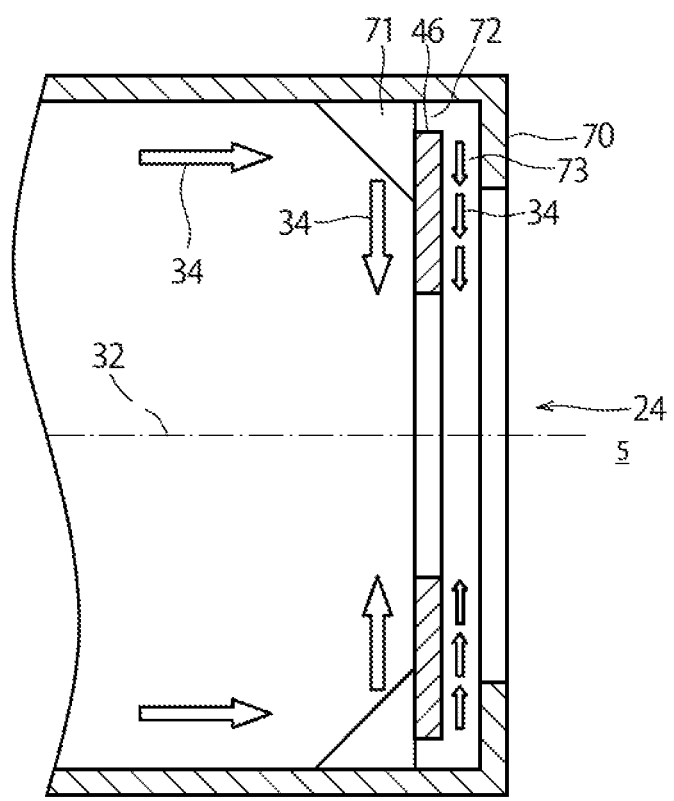
FIG. 11 is a diagram for describing a configuration of a guide member that is applicable to a burner.

FIG. 11 is a diagram for describing a configuration of a guide member 70 that is applicable to the burner 20. As shown in FIG. 11, the guide member 70 is configured to guide at least a part of the inner combustion oxygen containing gas 34 along the surface of the inner flame holder 46 on the side of the furnace 5.

With the above described guide member 70, a part of the inner combustion oxygen containing gas 34 flows along the surface of the inner flame holder 46 on the side of the furnace 5, and thereby it is possible to cool the inner flame holder 46, and to suppress adhesion of ash to the inner flame holder 46.

For instance, the guide member 70 comprises an annular flange portion protruding inward from the opening edge of the outlet section of the fuel supply nozzle 26. The inner flame holder 46 comprises an annular plate, and is disposed inside the outlet section of the fuel supply nozzle 26. The inner flame holder 46 is supported by a support member 71, for instance, while protruding inward from the guide member 70. Furthermore, a gap 72 is ensured between the inner flame holder 46 and the inner wall of the fuel supply nozzle 26, and a gap 73 is ensured between the inner flame holder 46 and the guide member 70. A part of the inner combustion oxygen containing gas 34 flows through the gaps 72, 73, and can flow along the surface of the inner flame holder 46 on the side of the furnace 5.

In the present specification, an annular shape may include a polygonal shape and the like, besides a circular shape.

Figure 12:
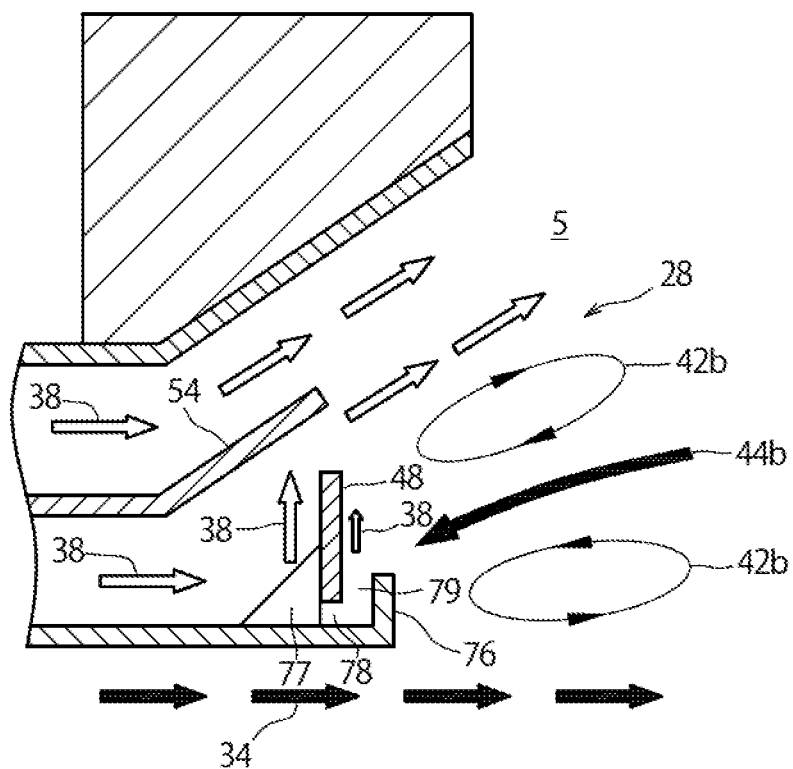
FIG. 12 is a diagram for describing a configuration of a guide member that is applicable to a burner.

FIG. 12 is a diagram for describing a configuration of a guide member 76 that is applicable to the burner 20. As shown in FIG. 12, the guide member 76 is configured to guide at least a part of the outer combustion oxygen containing gas 38 to flow along the surface of the outer flame holder 48 on the side of the furnace 5.

With the above described guide member 76, a part of the outer combustion oxygen containing gas 38 flows along the surface of the outer flame holder 48 on the side of the furnace 5, and thereby it is possible to cool the outer flame holder 48, and to suppress adhesion of ash to the outer flame holder 48.

For instance, as shown in FIG. 12, the guide member 76 comprises a flange portion protruding outward from the edge of the inner wall of the outer gas nozzle 28, at the outlet section of the outer gas nozzle 28. The outer flame holder 48 comprises an annular plate, and is disposed inside the outlet section of the outer gas nozzle 28. The outer flame holder 48 is supported by a support member 77, for instance, while protruding outward from the guide member 76. Furthermore, a gap 78 is ensured between the outer flame holder 48 and the inner wall of the outer gas nozzle 28, and a gap 79 is ensured between the outer flame holder 48 and the guide member 76. A part of the outer combustion oxygen containing gas 38 flows through the gaps 78, 79, and can flow along the surface of the outer flame holder 48 on the side of the furnace 5.

Figure 13:
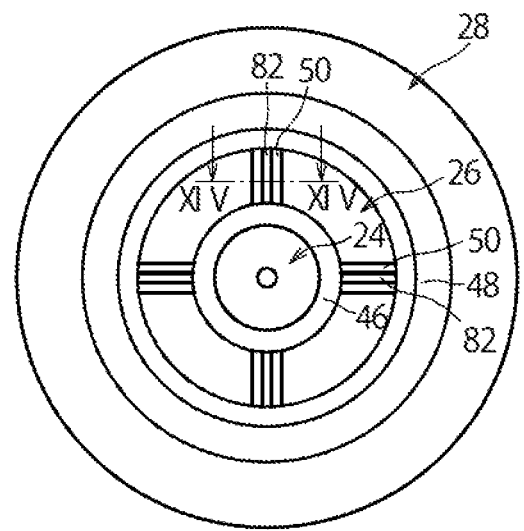
FIG. 13 is a diagram for describing a configuration of a guide member that is applicable to a burner.
Figure 14:
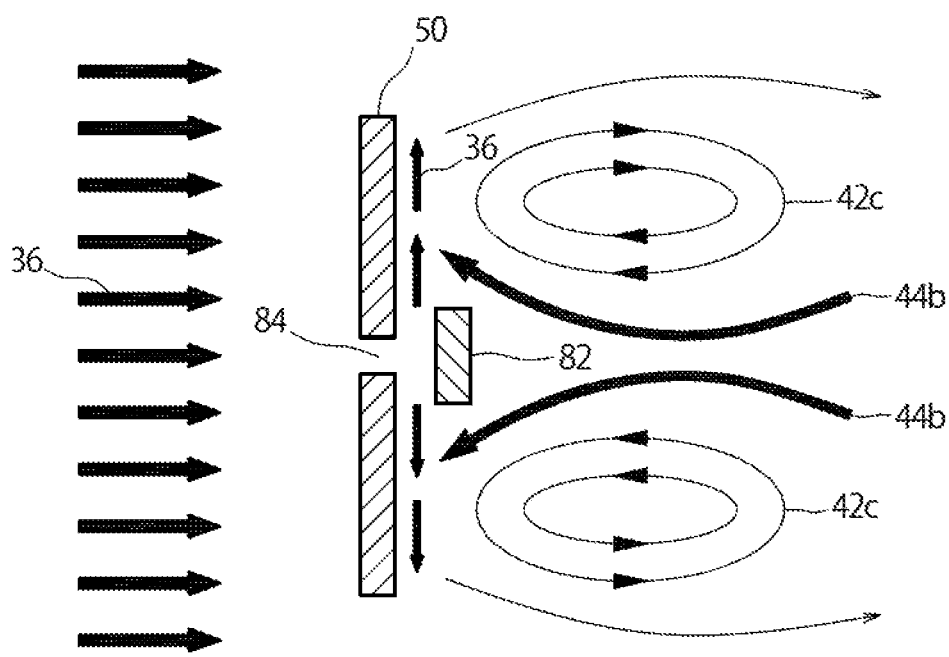
FIG. 14 is a schematic cross-sectional view taken along line XIV-XIV in FIG. 13.

FIGS. 13 and 14 are diagrams for describing the configuration of a guide member 82 that is applicable to the burner 20. FIG. 13 is a schematic front view of the burner 20 provided with the guide member 82, and FIG. 14 is a schematic cross-sectional view taken along lines XIV-XIV in FIG. 13.

As shown in FIG. 14, the guide member 82 is configured to guide at least a part of the fluid mixture 36 along the surfaces of the intermediate flame holders 50 on the side of the furnace 5.

With the above described guide member 82, a part of the fluid mixture 36 flows along the surfaces of the intermediate flame holders 50 on the side of the furnace 5, and thereby it is possible to cool the intermediate flame holders 50, and to suppress adhesion of ash to the intermediate flame holders 50.

For instance, as shown in FIGS. 13 and 14, the guide member 82 is formed by a plate that extends intersecting the fuel supply nozzle 26, so as to cover a part of the surfaces of the intermediate flame holders 50 on the side of the furnace 5. The intermediate flame holder 50 has a slit 84 at a position covered by the guide member 82, and a part of the fluid mixture 36 can pass through the slit 84. The fluid mixture 36 having passed through the slit 84 hits the guide member 82 and turns, thus flowing along the surface of the intermediate flame holder 50 on the side of the furnace 5, and thereby it is possible to cool the intermediate flame holder 50, and to suppress adhesion of ash to the intermediate flame holder 50.

Further, as shown in FIGS. 13 and 14, if the guide member 82 covers the center section of the intermediate flame holders 50, the outer circulation eddies 42c are formed on both sides of the outer high-temperature gas circulation flow 44b, and thereby it is possible to stabilize ignition and flame holding even further in the outer flame holding region 40b.

In some embodiments, as shown in FIGS. 7, and 8, the inner gas nozzle 24 includes two or more inner gas flow passages 24a, 24b surrounding the axis 32 as seen in a direction along the axis 32. The burner 20d, 20e further comprises a flow-rate regulator 88 capable of regulating the flow rate of the inner combustion oxygen containing gas 34 flowing through the innermost gas flow passage 24a closest to the axis 32 as seen in a direction along the axis 32, from among the two or more inner gas flow passages 24a, 24b.

For instance, the two or more inner gas flow passages 24a, 24b can be formed by providing one or more tube-shaped member inside the inner gas nozzle 24. Furthermore, the flow-rate regulator 88 may comprise a door that can open and close the opening of the wall forming the innermost gas flow passage 24a.

In the above described burner 20d, 20e, the flow rate of the inner combustion oxygen containing gas flowing through the innermost gas flow passage 24a is regulated, and thereby it is possible to maintain the reducing condition in the inner flame holding region 40a regardless of the characteristics of the solid powder fuel, and to suppress generation of NOx.

The characteristics of the solid powder fuel include, for instance, the fuel ratio of coal. The fuel ratio of coal is a ratio of fixed carbon to volatile content, each of which is a component of coal. The higher the fuel ratio is, the less the volatile content. If coal of a high fuel ratio is used, the volatile content is small, and a high flow rate of the inner combustion oxygen containing gas 34 may weaken reduction, thus causing an increase in the generation amount of NOx. On the other hand, if the flow rate of the inner combustion oxygen containing gas 32 is simply reduced, the discharge flow velocity Fc of the inner combustion oxygen containing gas 34 decreases, which may make it difficult to form the inner flame holding region 40a.

In the burner 20d, 20e, the flow-rate regulator 88 is controlled so as to reduce the flow rate of the inner combustion oxygen containing gas 34 flowing through the innermost gas flow passage 24a when the fuel ratio of coal is high (a case of a high fuel ratio), as compared to when the fuel ratio of coal is low (a case of a mid-low fuel ratio). Accordingly, it is possible to reduce the flow rate (total flow rate) of the inner combustion oxygen containing gas 34 while maintaining the discharge flow velocity Fc of the inner combustion oxygen containing gas 34, and as a result, it is possible to maintain the inner flame holding region 40a and suppress generation of NOx.

Figure 15:
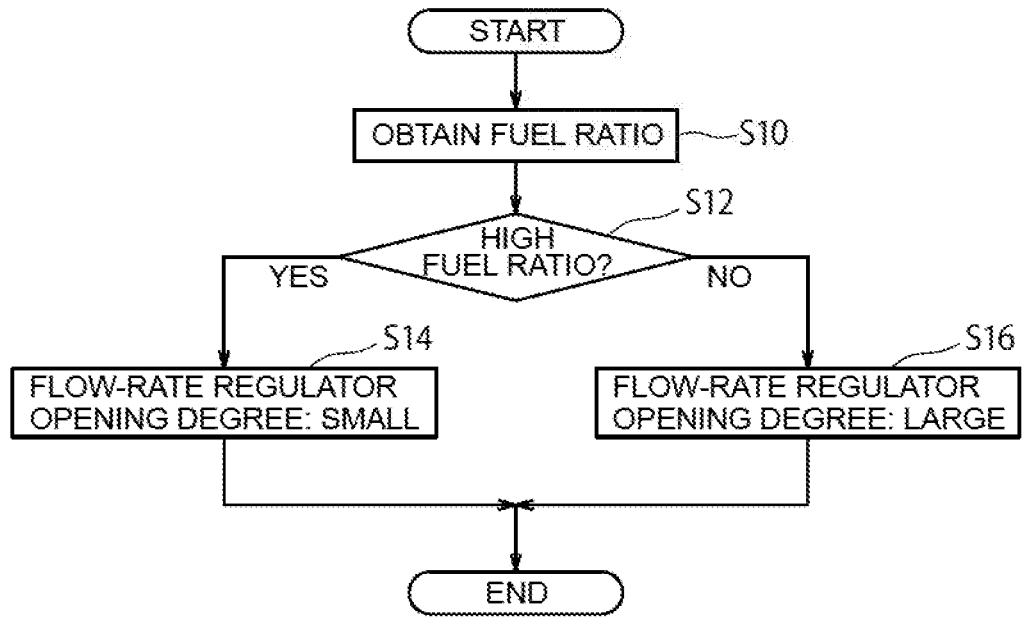
FIG. 15 is a flowchart of a schematic process of a method of controlling a burner according to an embodiment of the present invention.

FIG. 15 is a flowchart of a schematic process of a method of controlling the burner 20d, 20e provided with the above described flow-rate regulator 88. As shown in FIG. 15, the method of controlling the burner 20d, 20e includes a step S10 of obtaining a fuel ratio, a step S12 of determining whether the fuel ratio is high, a step S14 of setting a small opening for the flow-rate regulator 88 in a case of a high fuel ratio, and a step S16 of setting a large opening for the flow-rate regulator 88 in a case of a mid-low fuel ratio.

Whether the fuel ratio is high can be determined on the basis of whether the fuel ratio is greater than a threshold. For instance, a fuel ratio of coal being high (a high fuel ratio) refers to the fuel ratio being approximately not less than two, and a fuel ratio of coal being low (a mid-low fuel ratio) refers to the fuel ratio being approximately less than two. This threshold depends on the type of fuel and the particle size of the powdered fuel, and may be determined on the basis of a result of a test in a combustion test furnace or the like, for instance.

Herein, if the flow rate of the inner combustion oxygen containing gas 34 is reduced when the fuel rate is high and the inner combustion oxygen containing gas 34 and the outer combustion oxygen containing gas 38 are supplied from the same source, the flow rate of the outer combustion oxygen containing gas 38 relatively increases. If the flow rate of the outer combustion oxygen containing gas 38 increases, the discharge flow velocity Fo of the outer combustion oxygen containing gas 38 becomes faster, thus reducing the difference between the discharge flow velocity Fo of the outer combustion oxygen containing gas 38 and the discharge flow velocity Fc of the inner combustion oxygen containing gas 34, which may lead to a decrease in the stability of ignition and flame holding in the inner flame holding region 40a. This tendency is particularly strong if the intermediate flame holders 50 are provided and the pressure difference between the outer flame holding region 40b and the inner flame holding region 40a is utilized to form a flow of high-temperature gas flowing from the outer flame holding region 40b toward the inner flame holding region 40a.

In this regard, in some embodiments, the outer gas nozzle 28 is provided with an adequate size of flow path area in advance, so as to optimize the discharge flow velocity Fo of the outer combustion oxygen containing gas 38 when the fuel ratio is high. In a case of a mid-low fuel ratio, the outer gas flow-rate regulator 52 reduces the flow rate (total flow rate) of the outer combustion oxygen containing gas 38, and the flow rate (total flow rate) of the inner combustion oxygen containing gas 34 is increased by an amount corresponding to the reduced amount of the outer combustion oxygen containing gas 38.

Figure 16:
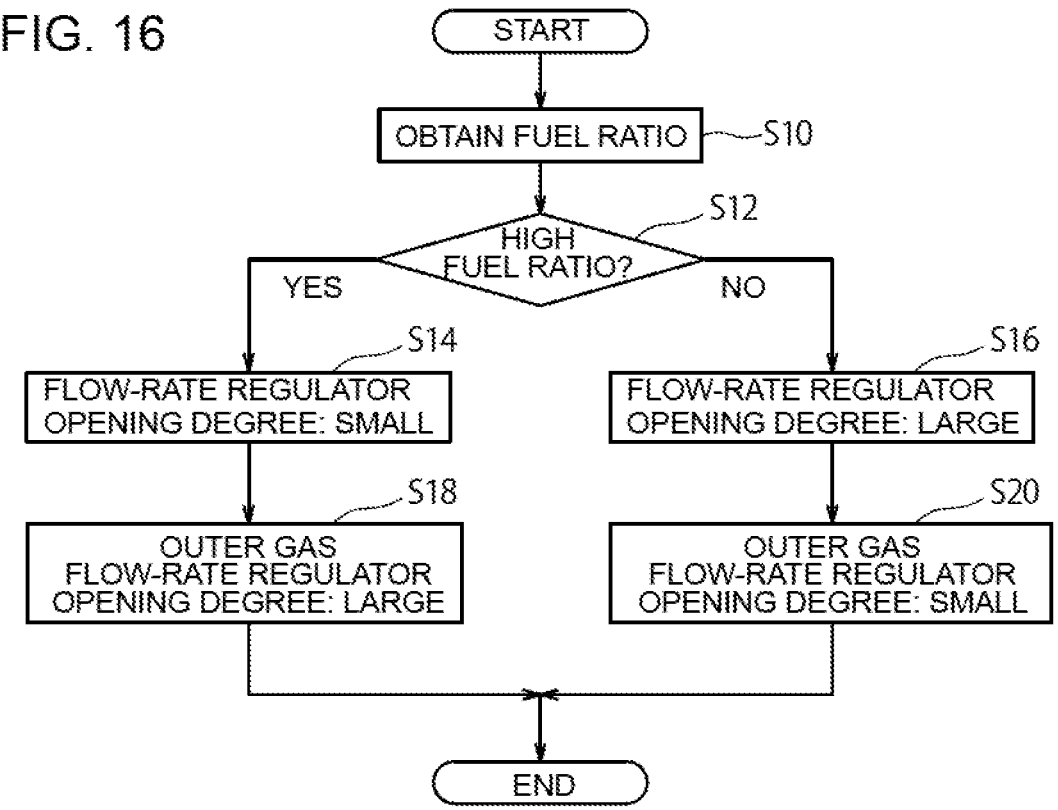
FIG. 16 is a flowchart of a schematic process of a method of controlling a burner according to another embodiment of the present invention.

FIG. 16 is a flowchart of a schematic process of a method of controlling the burner 20d, 20e provided with the above described flow-rate regulator 88. The control method shown in FIG. 16 further includes a step of increasing the flow path area of the outer gas nozzle 28, that is, a step S18 of increasing the opening of the outer gas flow-rate regulator 52, in a case of a high fuel ratio, and a step of reducing the flow path area of the outer gas nozzle 28, that is, a step S20 of reducing the opening of the outer gas flow-rate regulator 52, in a case of a mid-low fuel ratio.

In some embodiments, as shown in FIG. 7, in the burner 20d provided with the outer gas nozzle 28 having the first outer gas flow passage 28a and the second outer gas flow passage 28b, the outer gas flow-rate regulator 52 is operated so that the reduction rate of the flow rate of the outer combustion oxygen containing gas 38 in the second outer gas flow passage 28b is greater than that in the first outer gas flow passage 28a, when reducing the flow rate of the outer combustion oxygen containing gas 38 in a case of a mid-low fuel ratio.

Figure 17:
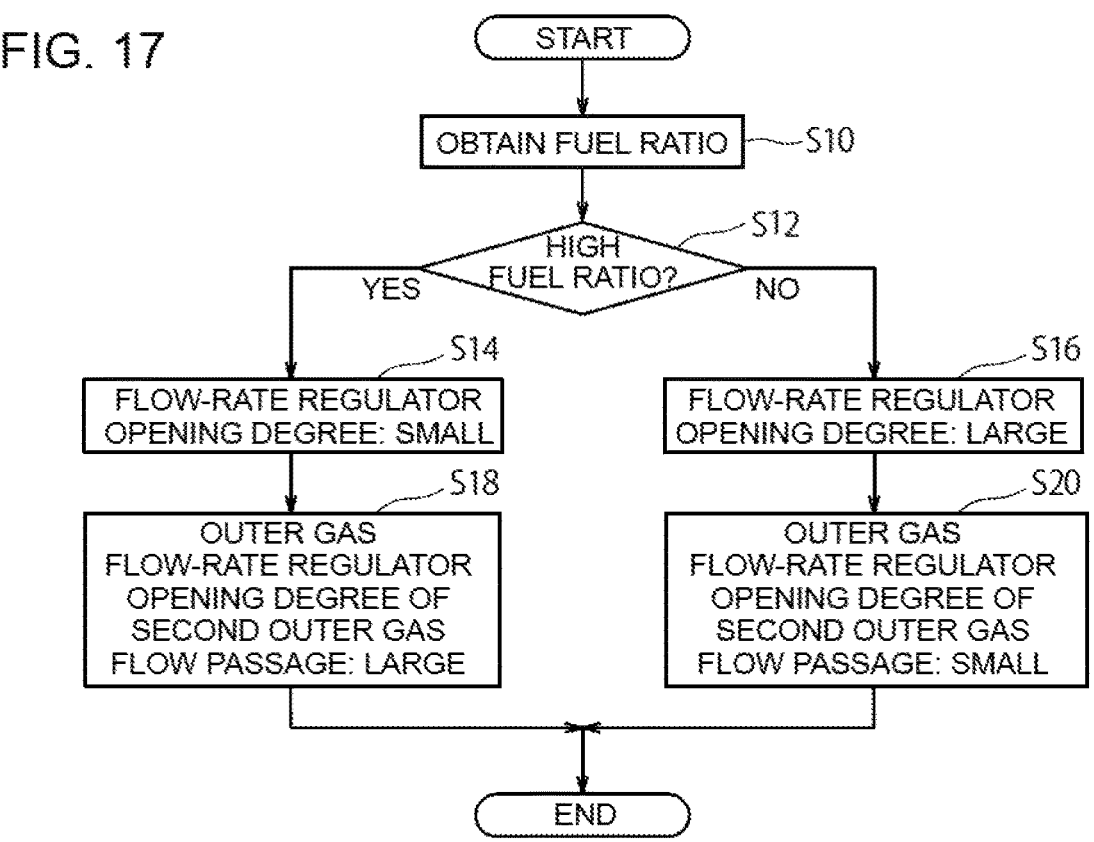
FIG. 17 is a flowchart of a schematic process of a method of controlling a burner according to another embodiment of the present invention.

FIG. 17 is a flowchart of a schematic process of a method of controlling the burner 20d provided with the above described flow-rate regulator 88. In the control method shown in FIG. 17, in the step 18 of increasing the opening of the outer gas flow-rate regulator 52, the opening of the outer gas flow-rate regulator 52 for the second outer gas flow passage 28b is increased, and in the step S20 of reducing the opening of the outer gas flow-rate regulator 52, the opening of the outer gas flow-rate regulator 52 for the second outer gas flow passage 28b is reduced.

Furthermore, if the flow rate (total flow rate) of the outer combustion oxygen containing gas 38 is reduced in a case of a mid-low fuel ratio when the inner combustion oxygen containing gas 34 and the outer combustion oxygen containing gas 38 are supplied from the same supply source, the discharge flow velocity Fo of the outer combustion oxygen containing gas 38 decreases, and the outer circulation eddies 42b may weaken. As a result, the stability of ignition and flame holding may decrease in the outer flame holding region 40b.

In this regard, in some embodiments, as shown in FIG. 8, in the burner 20e provided with the outer gas nozzle 28 having the first outer gas flow passage 28a, the second outer gas flow passage 28b, and the third outer gas flow passage 28c, the outer gas flow-rate regulator 52 is operated so that the reduction rate of the flow rate of the outer combustion oxygen containing gas 38 in the third outer gas flow passage 28c is greater than the reduction rate of the flow rate of the outer combustion oxygen containing gas 38 in the second outer gas flow passage 28 b, when reducing the flow rate (total flow rate) of the outer combustion oxygen containing gas 38 in a case of a mid-low fuel ratio. In other words, in a case where the outer gas nozzle 28 has a plurality of outer gas flow passages, the outer gas flow-rate regulator 52 is operated so that the reduction rate of the flow rate of the outer combustion oxygen containing gas 38 is greatest in the outermost gas flow passage. Accordingly, it is possible to suppress reduction of the discharge flow velocity Fo of the outer combustion oxygen containing gas 38 in a case of a mid-low fuel ratio, and to suppress weakening of the outer circulation eddies 42b.

Figure 18:
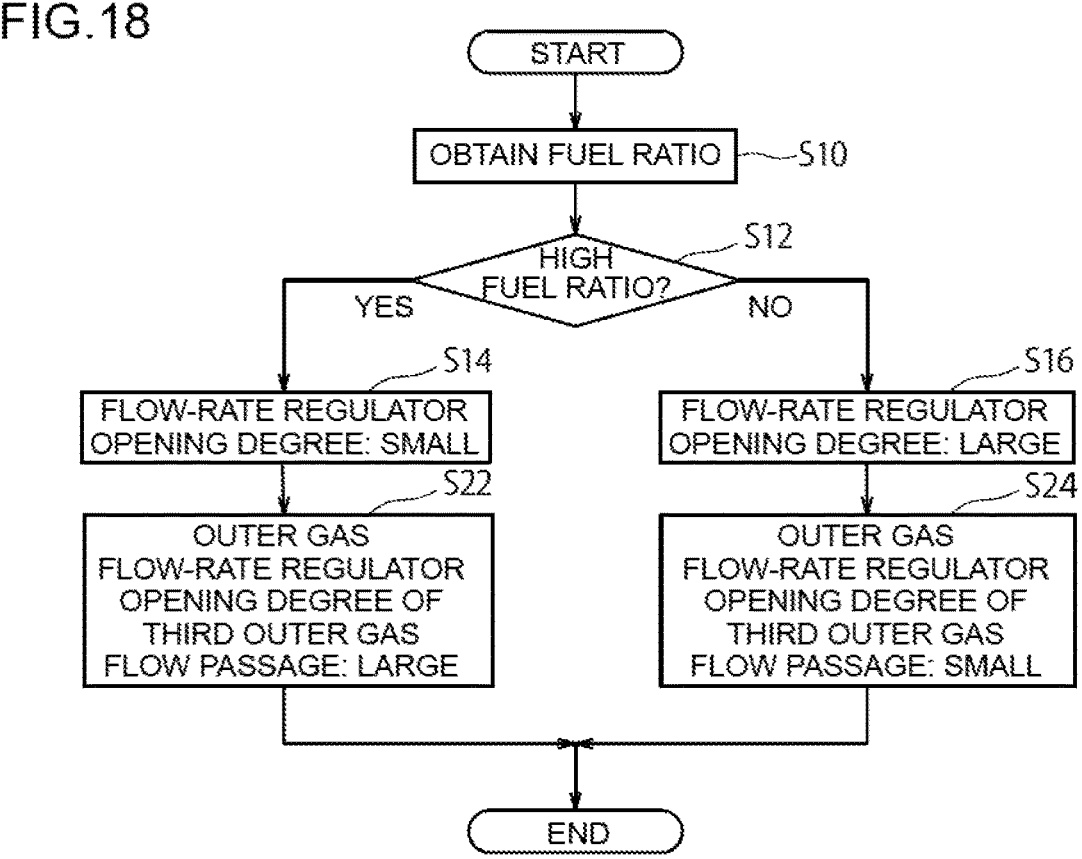
FIG. 18 is a flowchart of a schematic process of a method of controlling a burner according to another embodiment of the present invention.

FIG. 18 is a flowchart of a schematic process of a method of controlling the burner 20e provided with the above described flow-rate regulator 88. In the control method shown in FIG. 18, in the step S22 of increasing the opening of the outer gas flow-rate regulator 52, the opening of the outer gas flow-rate regulator 52 for the third outer gas flow passage 28c is increased, and in the step S24 of reducing the opening of the outer gas flow-rate regulator 52, the opening of the outer gas flow-rate regulator 52 for the third outer gas flow passage 28c is reduced.

Figure 19:
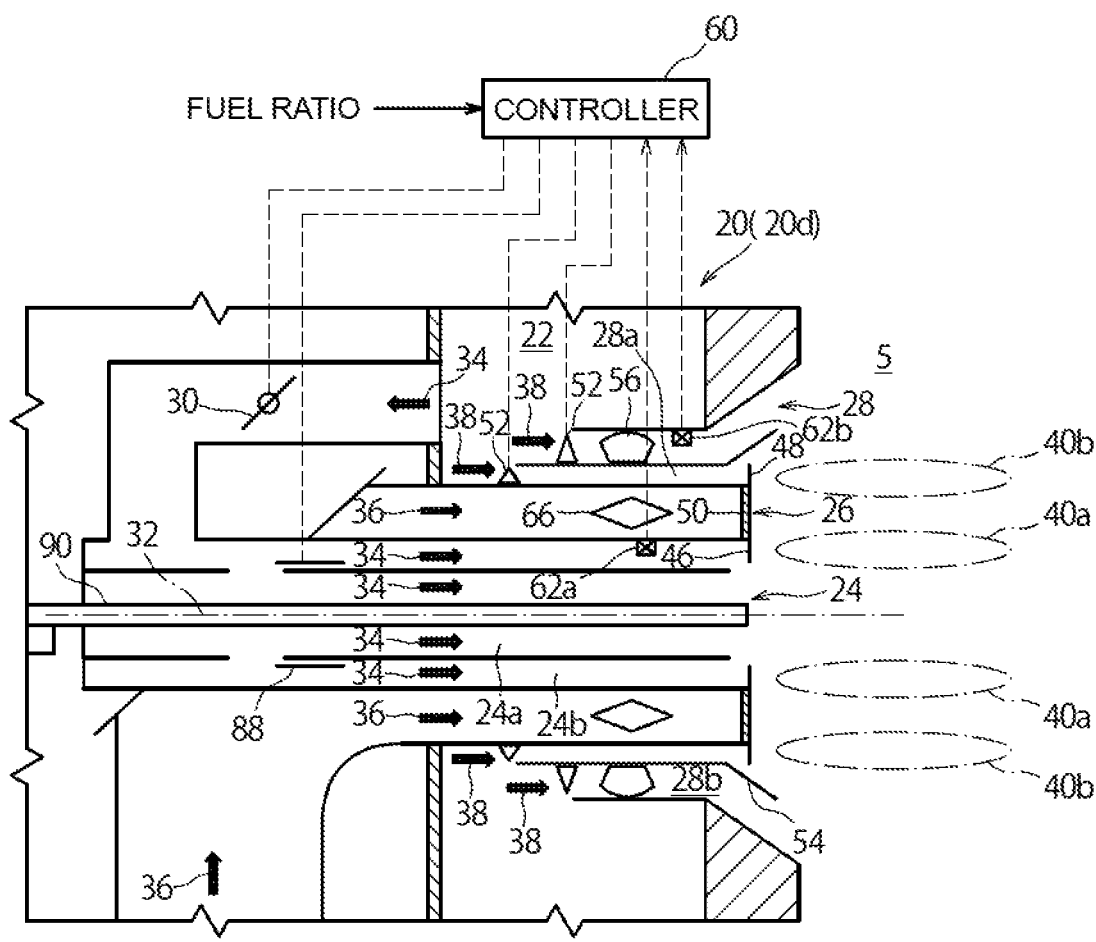
FIG. 19 is a diagram for describing another embodiment, where control equipment is applied to a burner.
Figure 20:
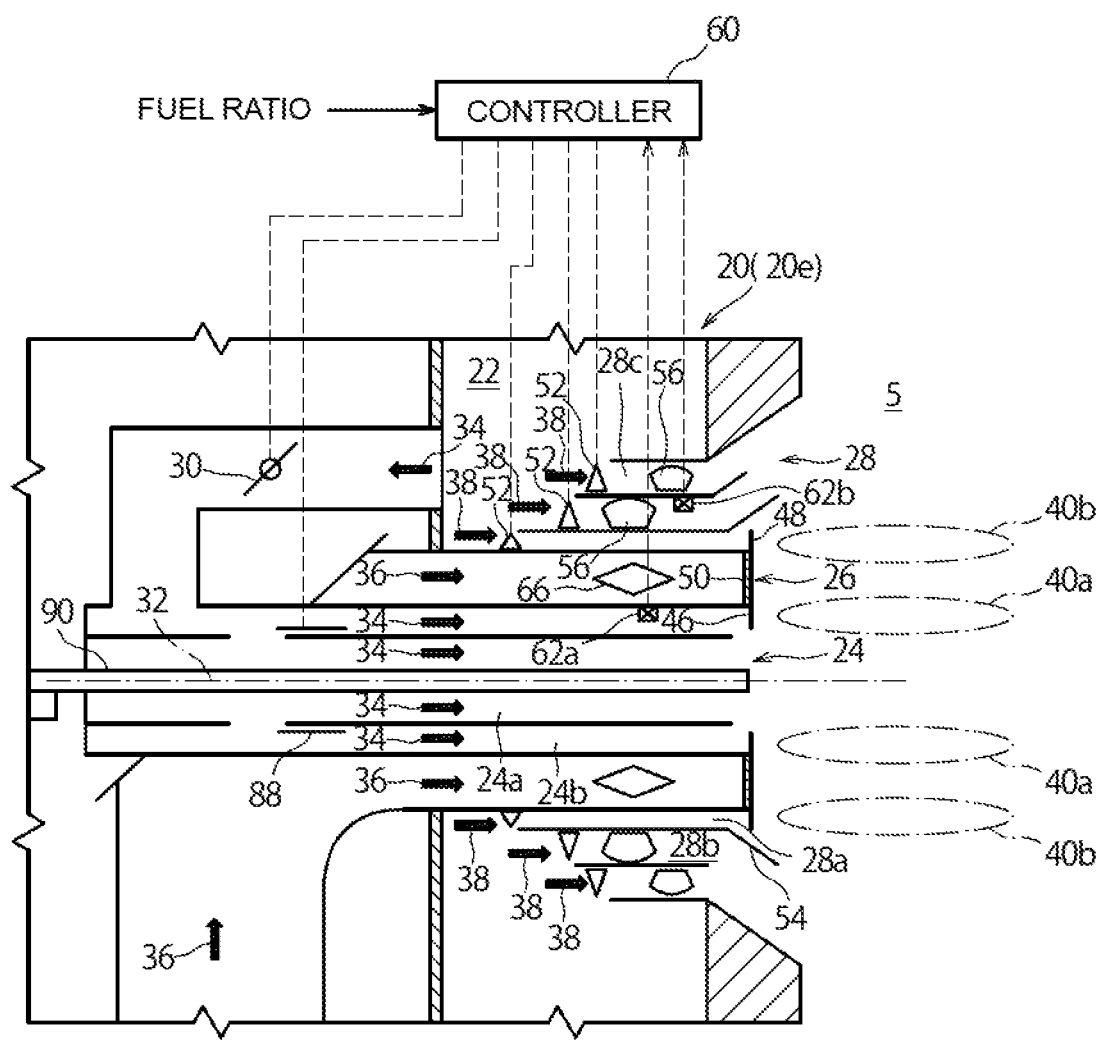
FIG. 20 is a diagram for describing another embodiment, where control equipment is applied to a burner.

In some embodiments, as shown in FIGS. 19 and 20, the control equipment 60 can control the flow-velocity-ratio adjustment apparatus 30, the flow-rate regulator 88, and the outer gas flow-rate regulator 52 via a driving device (not shown), and can perform the control method shown in FIGS. 15 to 18 automatically. The fuel ratio of the solid powder fuel can be input into the control equipment 60 automatically or manually.

The flow-velocity-ratio adjustment apparatus 30, the flow-rate regulator 88, and the outer gas flow-rate regulator 52 may be operated manually.

In some embodiments, as shown in FIGS. 5, 7, and 8, the burner 20c, 20d, 20e further includes an oil nozzle 90 disposed along the axis 32. The oil nozzle 90 is used when the burner 20c, 20d, 20e is started.

In some embodiments, the solid powder fuel is powdered coal, and as shown in FIG. 1, the powdered coal is obtained by pulverizing coal with mills 92 provided alongside the boiler 1. The powdered coal is carried by carrier gas supplied from a fan 94, and is supplied to the fuel supply nozzle 26 of the burner 20. Furthermore, oxygen containing gas is supplied to the wind box 22 from a fan 96. The carrier gas and the oxygen containing gas are air, for instance. A part of the carrier gas and the oxygen containing gas can be heated to suitable temperature by a heater 98. The heater 98 may be assembled with the boiler 1.

In some embodiments, an additional gas nozzle 100 for combustion is mounted to the furnace 5, above the burner 20, which is capable of supplying oxygen containing gas.

Embodiments of the present invention were described in detail above, but the present invention is not limited thereto, and various amendments and modifications may be implemented.

Figure 21:
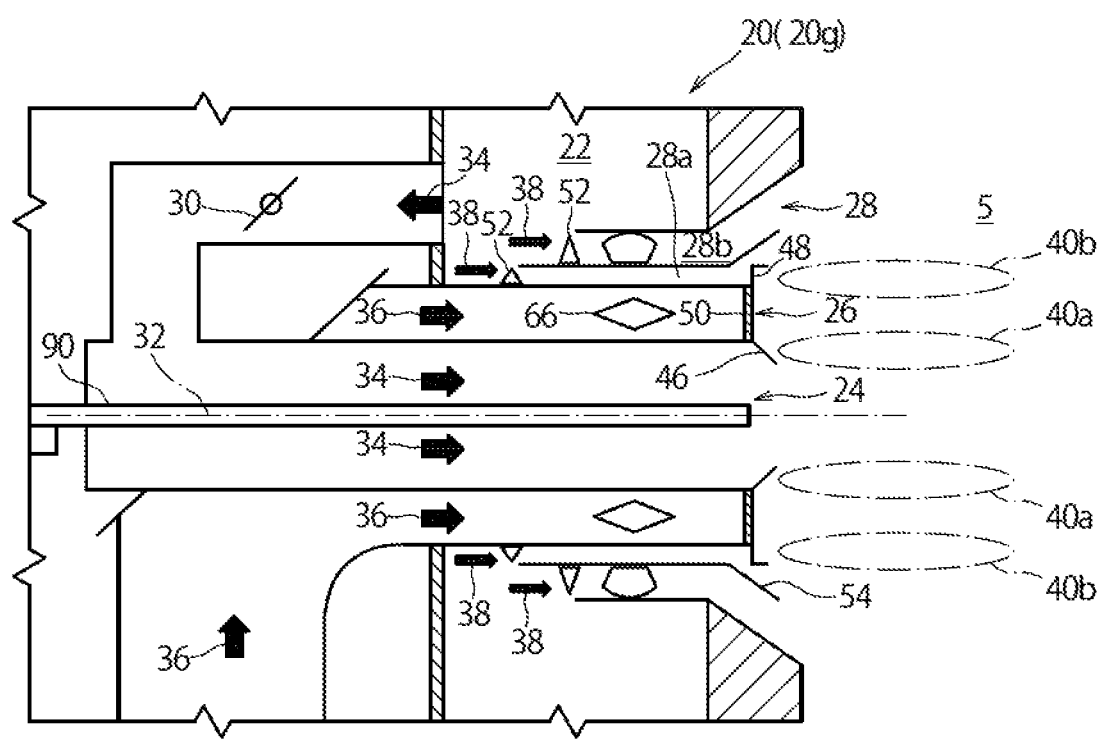
FIG. 21 is a diagram for describing a modified example of the burner shown in FIG. 5.

For instance, the inner flame holder 46 only needs to be configured to contract the flow of the inner combustion oxygen containing gas 34, and the size, shape, and layout of the inner flame holder 46 is not limited to the example shown in FIG. 2 and the like. FIG. 21 is a schematic configuration diagram of a burner 20g, which is a modification example of the burner 20c. In the burner 20g, a plate-shaped member forming the inner flame holder 46 is connected to the periphery of the outlet section of the inner gas nozzle 24 at an angle other than a right angle, for example, an obtuse angle greater than 90 degrees. Besides, the plate-shaped member forming the inner flame holder 46 may be integrally connected to the plate-shaped member forming the outer flame holder 48.

The outer flame holder 48 is disposed on the outlet section of the outer gas nozzle 28 and only needs to be configured to deviate the flow of the outer combustion oxygen containing gas 38 from the axis 32, and the size, shape, and layout of the outer flame holder 48 is not limited to the example shown in FIG. 2 and the like. For instance, the plate-shaped member forming the outer flame holder 48 may be connected integrally to the plate-shaped member forming the inner flame holder 46, or may be connected to the periphery of the outlet section of the outer gas nozzle 28 at an angle other than a right angle, for example, an obtuse angle greater than 90 degrees. Furthermore, the outer flame holder 48 may be formed by a plate-shaped member having an L-shaped cross section, as shown in FIG. 21.

DESCRIPTION OF REFERENCE NUMERALS

1 Boiler
5 Furnace

10 Combustion device
20 Burner
22 Wind box
24 Inner gas nozzle
24a, 24b Inner gas flow passage
26 Fuel supply nozzle
28 Outer gas nozzle
28a, 28b, 28c Outer gas flow passage
30 Flow-velocity-ratio adjustment apparatus
32 Axis
34 Inner combustion oxygen containing gas
36 Fluid mixture
38 Outer combustion oxygen containing gas
40a Inner flame holding region
40b Outer flame holding region
42a Inner circulation eddy
42b Outer circulation eddy
44a Inner high-temperature gas circulation flow
44b Outer high-temperature gas circulation flow
46 Inner flame holder
48 Outer flame holder
50 Intermediate flame holder
52 Outer gas flow-rate regulator
54 Second-outer-gas guide vane
56 Swirl creating apparatus
60 Control equipment
62a, 62b Pressure sensor
64 Driving device
66 Concentrator
70 Guide member
71 Support member
72 Gap
73 Gap
76 Guide member
77 Support member
78 Gap
79 Gap
82 Guide member
83 Support member
84 Gap
85 Gap
88 Flow-rate regulator
90 Oil nozzle
92 Mill
94 Fan
96 Fan
98 Heater
100 Additional combustion gas nozzle

The invention claimed is:

1. A burner, comprising:
an inner gas nozzle which extends along an axis while surrounding the axis, and which is capable of supplying a furnace with an inner combustion oxygen containing gas;
a fuel supply nozzle surrounding the inner gas nozzle as seen in a direction along the axis, the fuel supply nozzle being capable of supplying the furnace with a fluid mixture of solid powder fuel and a carrier gas;
an outer gas nozzle surrounding the fuel supply nozzle as seen in the direction along the axis, the outer gas nozzle being capable of supplying the furnace with an outer combustion oxygen containing gas;
a flow-velocity-ratio adjustment apparatus capable of adjusting a relative flow velocity ratio of a discharge flow velocity of the inner combustion oxygen containing gas to a discharge flow velocity of the outer combustion oxygen containing gas; and
a plurality of middle flame holders extending between an outlet section of the inner gas nozzle and an outlet section of the outer gas nozzle so as to intersect an outlet section of the fuel supply nozzle,
wherein, at downstream of an outlet of the fuel supply nozzle, flame holding regions are formed on a side of a discharge flow of the inner combustion oxygen containing gas and a side of a discharge flow of the outer combustion oxygen containing gas, respectively, of a discharge flow of the fluid mixture.

2. A burner, comprising:
an inner gas nozzle which extends along an axis while surrounding the axis, and which is capable of supplying a furnace with an inner combustion oxygen containing gas;
a fuel supply nozzle surrounding the inner gas nozzle as seen in a direction along the axis, the fuel supply nozzle being capable of supplying the furnace with a fluid mixture of a solid powder fuel and a carrier gas;
an outer gas nozzle surrounding the fuel supply nozzle as seen in the direction along the axis, the outer gas nozzle being capable of supplying the furnace with an outer combustion oxygen containing gas;
an inner flame holder disposed on an outlet section of the inner gas nozzle and configured to contract a flow of the inner combustion oxygen containing gas;
an outer flame holder disposed on an outlet section of the outer gas nozzle and configured to deviate a flow of the outer combustion oxygen containing gas from the axis;
a flow-velocity-ratio adjustment apparatus capable of adjusting a relative flow velocity ratio of a discharge flow velocity of the inner combustion oxygen containing gas to a discharge flow velocity of the outer combustion oxygen containing gas; and
a plurality of middle flame holders extending between an outlet section of the inner gas nozzle and an outlet section of the outer gas nozzle so as to intersect an outlet section of the fuel supply nozzle.

3. The burner according to claim 1, configured such that the discharge flow velocity of the inner combustion oxygen containing gas is higher than the discharge flow velocity of the outer combustion oxygen containing gas.

4. The burner according to claim 1,
wherein the outer gas nozzle includes two or more outer gas flow passages surrounding the fuel supply nozzle as seen in the direction along the axis, and
wherein the outer combustion oxygen containing gas is capable of being supplied to the furnace through the two or more outer gas flow passages.

5. The burner according to claim 4, further comprising an outer gas flow-rate regulator provided for at least one of the two or more outer gas flow passages.

6. The burner according to claim 1,
wherein the inner gas nozzle includes two or more inner gas flow passages each of which surrounds the axis as seen in the direction along the axis, and
wherein the burner further comprises a flow-rate regulator capable of regulating the flow rate of the inner combustion oxygen containing gas flowing through an innermost combustion gas supply flow passage disposed innermost as seen in the direction along the axis from among the two or more inner gas flow passages.

7. The burner according to claim 1, further comprising control equipment capable of automatically controlling the flow-velocity-ratio adjustment apparatus.

8. The burner according to claim 7, further comprising a pressure sensor disposed on an outlet section of the inner gas nozzle or an outlet section of the outer gas nozzle,
   wherein the control equipment is capable of controlling the flow-velocity-ratio adjustment apparatus on the basis of an output of the pressure sensor.

9. The burner according to claim 1, further comprising
   at least one of: an inner flame holder disposed on an outlet section of the inner gas nozzle and configured to contract a flow of the inner combustion oxygen containing gas; an outer flame holder disposed on an outlet section of the outer gas nozzle and configured to deviate a flow of the outer combustion oxygen containing gas from the axis; or a plurality of intermediate flame holders extending between the outlet section of the inner gas nozzle and the outlet section of the outer gas nozzle so as to intersect an outlet section of the fuel supply nozzle; and
   a guide member capable of guiding at least a part of the inner combustion oxygen containing gas, the outer combustion oxygen containing gas, or the fluid mixture, along a furnace-side surface of the at least one flame holder.

10. A combustion device, comprising:
    a wind box; and
    the burner according to claim 1 covered with the wind box.

11. A boiler, comprising:
    a furnace;
    a wind box mounted to the furnace; and
    the burner according to claim 1 mounted to the furnace and covered with the wind box.

12. A method of controlling a burner which comprises:
    an inner gas nozzle which extends along an axis while surrounding the axis, and which is capable of supplying a furnace with an inner combustion oxygen containing gas;
    a fuel supply nozzle surrounding the inner gas nozzle as seen in a direction along the axis, the fuel supply nozzle being capable of supplying the furnace with a fluid mixture of a solid powder fuel and a carrier gas;
    an outer gas nozzle surrounding the fuel supply nozzle as seen in the direction along the axis, the outer gas nozzle being capable of supplying the furnace with an outer combustion oxygen containing gas;
    a flow-velocity-ratio adjustment apparatus capable of adjusting a relative flow velocity ratio of a discharge flow velocity of the inner combustion oxygen containing gas to a discharge flow velocity of the outer combustion oxygen containing gas; and
    a plurality of middle flame holders extending between an outlet section of the inner gas nozzle and an outlet section of the outer gas nozzle so as to intersect an outlet section of the fuel supply nozzle,
    wherein, at downstream of an outlet of the fuel supply nozzle, flame holding regions are formed on a side of a discharge flow of the inner combustion oxygen containing gas and a side of a discharge flow of the outer combustion oxygen containing gas, respectively, of a discharge flow of the fluid mixture,
    wherein the inner gas nozzle includes two or more inner gas flow passages each of which surrounds the axis as seen in the direction along the axis, and
    wherein the burner further comprises a flow-rate regulator capable of regulating the flow rate of the inner combustion oxygen containing gas flowing through an innermost combustion gas supply flow passage disposed innermost as seen in the direction along the axis from among the two or more inner gas flow passages,
    the method comprising:
    setting an opening of the flow-rate regulator to be smaller when a fuel ratio of the solid powder fuel is higher than a threshold, than when the fuel ratio of the solid powder fuel is not higher than the threshold.

13. The method of controlling a burner according to claim 12,
    wherein the burner further comprises an outer gas flow-rate regulator capable of regulating a flow rate of the outer combustion oxygen containing gas, and
    wherein the method comprises setting an opening of the outer gas flow-rate regulator to be larger when the fuel ratio of the solid powder fuel is higher than the threshold than when the fuel ratio of the solid powder fuel is not higher than the threshold.

14. The method of controlling a burner according to claim 13,
    wherein the outer gas nozzle includes two or more outer gas flow passages surrounding the fuel supply nozzle as seen in the direction along the axis, and
    wherein the outer combustion oxygen containing gas is capable of being supplied to the furnace through the two or more outer gas flow passages,
    wherein the outer gas flow-rate regulator is capable of regulating a flow rate of the outer combustion oxygen containing gas in an outermost outer gas flow passage, and
    wherein the method comprises setting the opening of the outer gas flow-rate regulator to be larger when the fuel ratio of the solid powder fuel is higher than the threshold than when the fuel ratio of the solid powder fuel is not higher than the threshold.

* * * * *